(12) United States Patent
Tominaga et al.

(10) Patent No.: US 9,793,784 B2
(45) Date of Patent: Oct. 17, 2017

(54) COOLING STRUCTURE FOR SLIP RING DEVICE

(71) Applicant: TOYOTA JIDOSHA KABUSHIKI KAISHA, Toyota-shi (JP)

(72) Inventors: Satoshi Tominaga, Susono (JP); Takahiro Shiina, Susono (JP); Akira Murakami, Gotenba (JP); Hitoshi Takayama, Nagoya (JP); Shu Asami, Nagoya (JP); Takao Watanabe, Nagakute (JP); Kiyoshi Uetsuji, Kariya (JP); Shuji Yumoto, Kariya (JP); Hirofumi Fujiwara, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 355 days.

(21) Appl. No.: 14/441,297

(22) PCT Filed: Nov. 14, 2013

(86) PCT No.: PCT/JP2013/081456
§ 371 (c)(1),
(2) Date: May 7, 2015

(87) PCT Pub. No.: WO2014/087848
PCT Pub. Date: Jun. 12, 2014

(65) Prior Publication Data
US 2015/0288256 A1    Oct. 8, 2015

(30) Foreign Application Priority Data

Dec. 5, 2012 (JP) .................................. 2012-266485

(51) Int. Cl.
*H02K 9/28* (2006.01)
*B60L 3/00* (2006.01)
(Continued)

(52) U.S. Cl.
CPC .............. *H02K 9/28* (2013.01); *B60L 3/0061* (2013.01); *B60L 11/123* (2013.01); *B60L 11/14* (2013.01);
(Continued)

(58) Field of Classification Search
CPC    H02K 9/00; H02K 9/28; H02K 13/00; H02K 13/003; B60L 3/0061; B60L 11/123; B60L 11/14; B60K 6/26; B60K 6/48
(Continued)

(56) References Cited

U.S. PATENT DOCUMENTS 3,784,855 A * 1/1974 Motegi ................ H02K 13/003
                                                                 310/227
4,137,474 A * 1/1979 Krieger .................. H01R 39/08
                                                                 310/227
(Continued)

FOREIGN PATENT DOCUMENTS

JP        10-14011        1/1998
JP        2004-208463     7/2004
(Continued)

OTHER PUBLICATIONS

International Search Report issued Jan. 26, 2015, in PCT/JP2013/081456, filed Nov. 14, 2013.

*Primary Examiner* — Tran Nguyen
(74) *Attorney, Agent, or Firm* — Oblon, McClelland, Maier & Neustadt, L.L.P.

(57) ABSTRACT

There is provided a cooling structure whose performance for cooling ring members and brushes is enhanced. In a cooling structure applied to a slip ring device including ring members provided to an input shaft and brushes contacting with these ring members, the input shaft includes a shaft member where an external spline portion is formed, and a cylindrical member that is installed over the external circumference of
(Continued)

the shaft member so that an internal spline portion formed on the cylindrical member is meshed with the external spline portion, and that the ring members are fixed to the cylindrical member. The internal spline portion is formed upon a portion of the inner circumferential surface of the cylindrical member that lies on the radially inward side of the ring members.

13 Claims, 17 Drawing Sheets

(51) Int. Cl.
    *B60L 11/12*         (2006.01)
    *B60L 11/14*         (2006.01)
    *H02K 13/00*        (2006.01)

(52) U.S. Cl.
    CPC ........ *H02K 13/003* (2013.01); *B60L 2240/12* (2013.01); *B60L 2240/36* (2013.01); *B60L 2240/425* (2013.01); *B60L 2240/486* (2013.01); *B60L 2240/507* (2013.01); *Y02T 10/6217* (2013.01); *Y02T 10/641* (2013.01); *Y02T 10/642* (2013.01); *Y02T 10/7077* (2013.01)

(58) Field of Classification Search
    USPC ........................................ 310/219, 227, 232
    See application file for complete search history.

(56) References Cited

U.S. PATENT DOCUMENTS

| | | | | |
|---|---|---|---|---|
| 4,334,159 | A | * | 6/1982 | Ooki ........................ H02K 9/28 |
| | | | | 310/227 |
| 4,410,821 | A | * | 10/1983 | Kurt ........................ H01R 39/08 |
| | | | | 310/227 |
| 5,744,895 | A | | 4/1998 | Seguchi et al. |
| 5,917,248 | A | | 6/1999 | Seguchi et al. |

FOREIGN PATENT DOCUMENTS

| | | |
|---|---|---|
| JP | 2010-126025 A | 6/2010 |
| JP | 2011-62061 A | 3/2011 |
| JP | 2011-166942 A | 8/2011 |

\* cited by examiner

COOLING STRUCTURE FOR SLIP RING DEVICE

TECHNICAL FIELD

The present invention relates to a cooling structure applied to a slip ring device which is provided with a ring member provided upon a rotation shaft, and with a brush which contacts the ring member.

BACKGROUND ART

There is known a slip ring device in which a ring member is provided upon a rotation shaft, at least one brush is pressed against the ring member, and exchange of electrical power or of electrical signals between these components is performed. As such slip ring device, there is known an apparatus in which the ring member and the brush are housed within a housing member whose surrounding wall is provided with a plurality of ventilation holes for heat dissipation (see Patent Literature 1). In addition, there are Patent Literatures 2, 3 as prior art references in relation to the present invention.

CITATION LIST

Patent Literature

Patent Literature 1: JP-2011-166942A
Patent Literature 2: JP-2011-062061A
Patent Literature 3: JP-2010-126025A

SUMMARY OF INVENTION

Technical Problem

As well known, emission of heat from any apparatus is promoted as the surface area of the apparatus increases. The Patent Literature 1 fail to disclose and teach increasing the surface area of the apparatus. Thereby, there is scope for improvement in the performance for cooling the ring member and the brush.

In view of the foregoing, one object of the present invention is to provide a cooling structure that is capable of enhancing the performance for cooling the ring member and the brush.

Solution to Problem

A cooling structure as one aspect of the present invention is a cooling structure applied to a slip ring device comprising at least one ring member provided upon a rotation shaft and at least one brush being provided for each of said at least one ring member to contact with the ring member, wherein said rotation shaft comprises: a shaft member upon an outer circumferential surface of which an external spline portion is formed; and a cylindrical member installed over an outer circumference of said shaft member so that an internal spline portion formed on an inner circumferential surface of said cylindrical member is meshed with said external spline portion, and also provided with said at least one ring member so as to is fixed to an outer circumferential surface of said cylindrical member, and said internal spline portion is formed on a portion of an inner circumferential surface of said cylindrical member, the portion lying on a radially inward side with respect to said at least one ring member.

According to the cooling structure of the present invention, since the internal spline portion is formed on the radially inward side with respect to the ring member, accordingly it is possible to increase the surface area of the inner circumferential surface of the cylindrical member. Due to this, it is possible to enhance heat dissipation from the cylindrical member. Moreover, since the internal spline portion is provided at this type of position, accordingly it is possible to reduce the temperature of the portion of the cylindrical member that lies on the radially inward side with respect to the ring member. And, due to this, it is possible to promote transfer of heat from the ring member to the cylindrical member. Because of this, it is possible to reduce the temperature of the ring member. And, due to this, it is possible to decrease the temperature of the brushes. And therefore it is possible to enhance the cooling performance for the ring member and the brush.

According to one embodiment of the cooling structure of the present invention, the cooling structure may further comprise a coolant supply device that supplies coolant to a space where said internal spline portion is disposed, the space being defined between said shaft member and said cylindrical member. According to this embodiment, since the internal spline portion is cooled by the coolant, accordingly it is possible to promote dissipation of heat from the cylindrical member. Due to this, it is possible to further reduce the temperatures of the ring member and of the brush.

In this embodiment of the present invention, said external spline portion may be formed upon a portion of the outer circumferential surface of said shaft member, the portion lying on a radially inward side with respect to said at least one ring member; and in at least one of said internal spline portion and said external spline portion, missing spline portions at each of which one of ridges arranged in a circumferential direction is lacked may be provided. According to this embodiment, since the missing spline portions are provided to one of the spline portions, accordingly it becomes hard to impede convection of the flow of oil in the radial direction at the radially inward side of the ring member. Due to this, it is possible to promote heat dissipation due to this convection. Moreover, by providing the missing spline portions in this manner, it is possible to reduce the load upon the coolant supply device.

In the embodiment of the present invention described above in which the coolant supply device is provided, the cooling structure may have the following features: said rotation shaft is provided to a rotating electrical machine; a plurality of said ring members are provided upon said rotation shaft so as to be lined up in sequence along an axial-line direction; during operation of said rotating electrical machine, temperature differences are generated between the plurality of ring members; said external spline portion is provided upon a portion of the outer circumferential surface of said shaft member, the portion lying on a radially inward side with respect to the plurality of ring members; in at least one of said internal spline portion and said external portion, a missing spline range is provided in which all ridges arranged in a circumferential direction are lacked over a predetermined length in the axial-line direction; and said missing spline range is provided on a radially inward side with respect to one of the ring members whose temperature is the lowest during the operation of said rotating electrical machine. In this case, it is impeded to transfer heat from the ring member whose temperature is the lowest, as compared with the temperatures of the other ring members. On the other hand, it is promoted to transfer heat from the other ring members. Due to this, it is possible to reduce the temperature differences between the plurality of ring members. Moreover, due to this, between the ring members, it is possible to reduce the temperature differences between the brushes. As is per se well known, the amount of wear upon a brush is increased if the temperature of the brush is higher. Due to this, it is possible to reduce the variations between the amounts of wear upon the brushes by reducing the temperature differences between the brushes.

In the embodiment of the present invention described above in which the coolant supply device is provided, the cooling structure may have the following features: said rotation shaft is provided to a rotating electrical machine; three of the ring members are provided upon said rotation shaft so as to be lined up in sequence along an axial-line direction; said external spline portion is provided upon a portion of the outer circumferential surface of said shaft member, the portion lying on a radially inward side with respect to the three ring members; in at least one of said internal spline portion and said external spline portion, a missing spline range is provided in which all ridges arranged in a circumferential direction are lacked over a predetermined length in the axial-line direction; and said missing spline range is provided on a radially inward side with respect to two of the three ring members disposed at both ends of the three ring members. At the ring member disposed at the center of the three ring members, dissipation of heat is impeded by the other two ring members lying at the ends of the sequence. On the other hand, since no ring member is present at one side of each of the two ring members lying at the ends of the sequence, accordingly heat can be dissipated from that side of each of those two ring members. For this reason, it is likely that the temperature of the central ring member will rise to be higher than the temperatures of the other two ring members at the ends of the sequence. However, in this embodiment, since the missing spline range is provided to the radially inward side of the ring members lying at both ends of the sequence, accordingly transfer of heat from these two ring members is suppressed. Due to this, it is possible to reduce the temperature differences between the three ring members. And since, due to this, it is possible to reduce differences between these ring members in the temperatures of brushes, accordingly it is possible to reduce the variations between the amounts of wear upon the brushes.

In those embodiments, missing spline portions at each of which one of ridges arranged in a circumferential direction is lacked may be provided in at least one of said internal spline portion and said external spline portion. According to this embodiment, since it is possible to make convection of the oil occur in this missing spline portions, accordingly it is possible to promote dissipation of heat there. Moreover, it is possible to reduce the load upon the coolant supply device.

And, in another embodiment of the cooling structure of the present invention, the cooling structure may have the following features: said rotation shaft is provided to a rotating electrical machine; said rotating electrical machine comprises: a first rotor that is disposed around the external circumference of said rotation shaft so as to leave a space between the first rotor and the rotation shaft, and also is linked to said cylindrical member; and a second rotor that is disposed coaxially around the external circumference of said first rotor and also is rotatable relatively to said first rotor; and said slip ring device is disposed in said space between said first rotor and said rotation shaft. If the slip ring device is disposed in a space of this type, then the freedom of arrangement is limited. However, in the present invention, since the surface area of the inner circumferential surface of the cylindrical member is increased, accordingly it is possible to enhance the cooling performance for the ring members and the brushes, without exerting any negative influence upon the freedom of arrangement.

In this embodiment of the present invention, the cooling structure may have the following features: the cooling structure further comprises: a coolant passage that comprises a first flow passage provided so as to extend along a center portion of said shaft member in an axial-line direction, second flow passage defined between said shaft member and said cylindrical member and provided with said internal spline portion, and a connection passage that connects said first flow passage and said second flow passage; and a coolant supply device that supplies coolant to said coolant passage so that said coolant flows in order through said first flow passage, said connection passage, and said second flow passage, and wherein a plurality of said ring members are provided upon said rotation shaft so as to be lined up in sequence along the axial-line direction, said first flow passage is provided so as to pass through the radially inward side with respect to said plurality of ring members, and one end portion of said first flow passage is located on the radially inward side with respect to a ring member that is disposed at one end of said sequence of said plurality of ring members, and said connection passage is provided so as to extend in a radially outward direction from said one end portion of said first flow passage. According to this embodiment, since the first flow passage and the second flow passage are provided to the radially inward side with respect to the plurality of ring members, accordingly the coolant passes twice through the radially inward side of the ring members. Due to this, it is possible to increase the heat exchange area between the rotation shaft and the coolant. And since, because of this, it is possible to promote dissipating heat from the rotation shaft, accordingly it is possible to reduce the temperatures of the ring members and the brushes.

In the above embodiment, the cooling structure may have the following features: said rotating electrical machine is installed to a drive system of a vehicle; said shaft member is linked to an output shaft of an internal combustion engine, and said second rotor is linked to an input shaft of a transmission; said one end portion of said first flow passage and said connection passage are disposed on the radially inward side with respect to a ring member that is disposed closest to said internal combustion engine within said sequence of said plurality of ring members; and said coolant supply device supplies said coolant to said coolant passage so that said coolant first flows through said first flow passage from a transmission side to an internal combustion engine side, then flows from said first flow passage via said connection passage into said second flow passage, and then flows through said second flow passage from said internal combustion engine side to said transmission side. In this case, it is possible to increase the heat exchange area between the rotation shaft and the coolant, since the coolant passes twice through the radially inward side with respect to the plurality of ring members.

In the above embodiment, alternatively the cooling structure may have the following features: said rotating electrical device is a three phase AC type rotating electrical machine; three of said ring members are provided upon said rotation shaft so as to be lined up in sequence along the axial-line direction; said external spline portion is formed upon a portion of the outer circumferential surface of said shaft member, the portion lying on the radially inward side with respect to said three ring members; in at least one of said internal spline portion and said external spline portion, a missing spline range is provided in which all ridges arranged in a circumferential direction are lacked over a predetermined length in the axial-line direction; and said missing spline range is provided on the radially inward side with respect to at least one of two ring members lying at both ends of the three ring members. In the three ring members that are arranged in this manner, the temperature of the ring member lying at the center of their sequence can easily become high. In consideration of this fact, by providing the missing spline range to the radially inward side with respect to at least one of the two ring members at both ends of the sequence of three ring members, it is possible to reduce the temperature differences between the three ring members. And since, due to this, it is possible to reduce the differences between the ring members in the temperatures of the brushes, accordingly it is possible to reduce the variations between the amounts of wear upon the brushes.

In this embodiment of the present invention, missing spline portions at each of which one of ridges arranged in a circumferential direction is lacked may be provided in at least one of said internal spline portion and said external spline portion. According to this aspect, since it is possible to make convection of oil occur in the missing spline portions, accordingly it is possible to promote dissipation of heat in this region. Moreover, it is possible to reduce the load upon the coolant supply device.

DESCRIPTION OF EMBODIMENTS

First Embodiment

Figure 1:
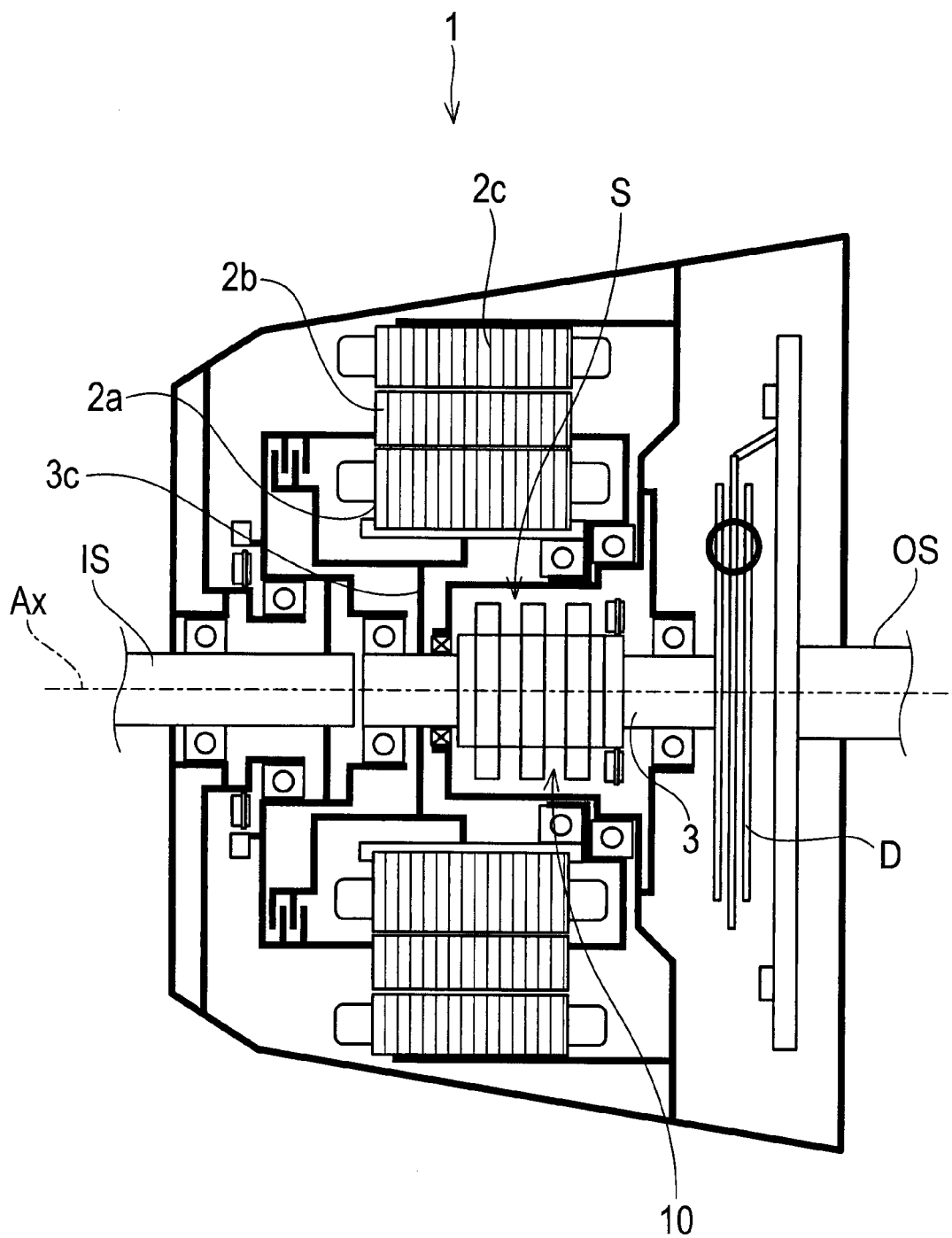
FIG. 1 is a diagram schematically showing a compound motor incorporated a slip ring device to which a cooling construction according to a first embodiment of the present invention is applied.

A cooling structure according to a first embodiment of the present invention will be described with reference to FIGS. 1 to 5. This cooling structure is applied to a slip ring device 10 that is incorporated to a compound motor 1 as a rotating electrical machine. The compound motor 1 is used by being incorporated to a drive system for a vehicle such as an automobile. Moreover, the compound motor 1 is a three-phase AC type motor. The compound motor 1 comprises a winding rotor 2a and a magnet rotor 2b that are disposed coaxially, and that are mounted so as to be capable of mutual relative rotation. A stator 2c is disposed around the outer circumferential sides of these rotors 2a and 2b, and is fixed so that it cannot rotate. The compound motor 1 is provided with an input shaft 3 as a rotating shaft. The winding rotor 2a is disposed around the outer circumference of the input shaft 3 with a space S being left between them. And, the winding rotor 2a is connected to the input shaft 3 by a connecting member 3c. The magnet rotor 2b is disposed around the outer circumference of the winding rotor 2a. Thereby, the winding rotor 2a corresponds to a first rotor of the present invention. And, the magnet rotor 2b corresponds to a second rotor of the present invention.

The compound motor 1 is provided between an internal combustion engine (hereinafter, referred to as an engine) and an automatic transmission that are provided to the drive system, neither of which is shown in the figures. In FIG. 1, the engine is disposed at the right side of the compound motor 1, and the automatic transmission is disposed at the left side of the compound motor 1. The compound motor 1 serves the function of amplifying the torque of the engine that is inputted to the winding rotor 2a and transmitting the amplified torque to the automatic transmission. The slip ring device 10 is a three-phase AC type slip ring device. And, the slip ring device 10 is used for conducting current between the winding rotor 2a and an inverter (not shown). The slip ring device 10 is installed over the outer circumference of the input shaft 3. Moreover, the slip ring device 10 is disposed in the space S between the input shaft 3 and the winding rotor 2a. The torque of the engine is inputted to the input shaft 3 via an output shaft OS of the engine and via a damper D. And, the torque outputted from the compound motor 1 is transmitted to an input shaft IS of the automatic transmission.

Figure 2:
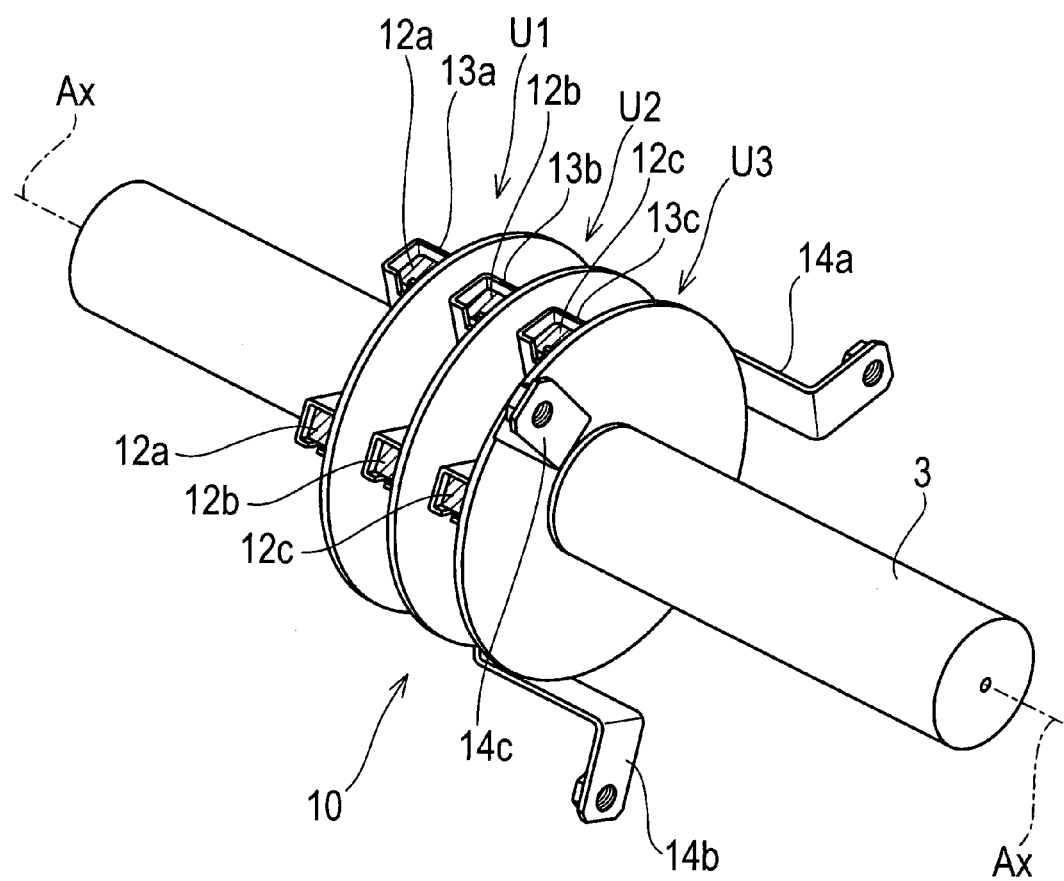
FIG. 2 is a perspective view of a part of the compound motor.
Figure 3:
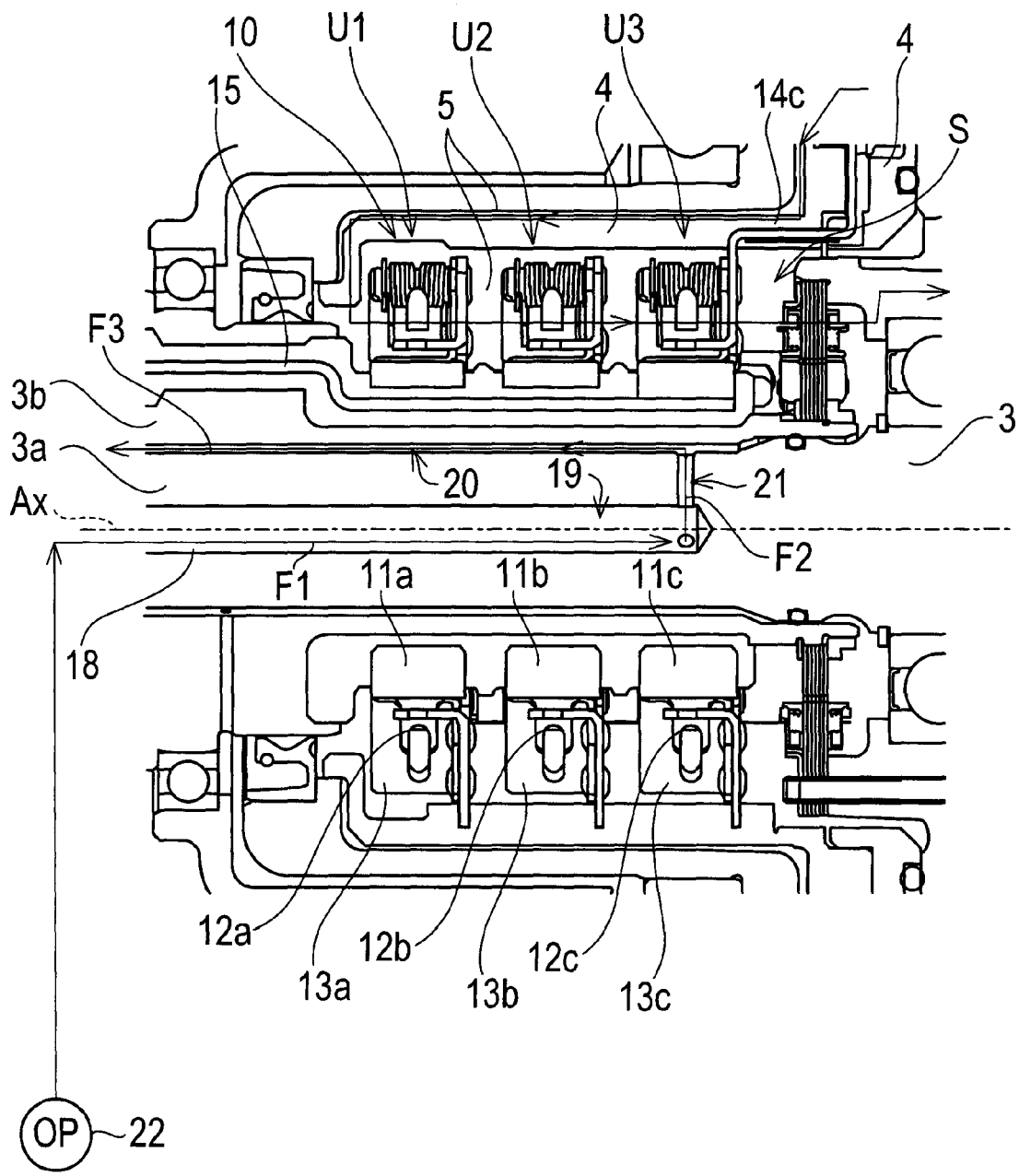
FIG. 3 is a sectional view of the surroundings of the slip ring device.

As shown in FIGS. 1 to 3, the slip ring device 10 includes three units U1 to U3 that correspond to the three phases of the winding rotor 2*a*. These units U1 to U3 are spaced apart in three stages along the direction of the axial line Ax of the input shaft 2. In FIG. 3, the first stage unit U1 that is disposed at the left side of the drawing comprises a ring member 11*a* that is installed around the outer circumference of the input shaft 3, brushes 12*a* that contact against the ring member 11*a*, a brush holder 13*a* that holds and supports the brushes 12*a*, and an outer bus bar 14*a* that is connected to the brush holder 13*a*. While only some of the brushes 12*a* are shown in the figure, a total of six brushes 12*a* are provided to the single brush holder 13*a*. These brushes 12*a* are spaced apart at angular intervals of 60° centered on the axis line Ax. The number of the brushes 12*a* could be chosen as desired. In a similar manner, the second stage unit U2 that is disposed in the center of the drawing comprises a ring member 11*b*, brushes 12*b*, a brush holder 13*b*, and an outer bus bar 14*b*. And, the third stage unit U3 that is disposed at the right side of the drawing comprises a ring member 11*c*, brushes 12*c*, a brush holder 13*c*, and an outer bus bar 14*c*.

As shown in FIG. 3, the ring members 11*a* to 11*c* are provided coaxially upon the outer circumferential surface of the input shaft 3. Moreover, these ring members 11*a* to 11*c* are electrically connected to the three phases of the winding rotor via inner bus bars 15 (an inner bus bar for only one phase is shown in FIG. 3). The brushes 12*a* to 12*c* that are supported by the brush holders 13*a* to 13*c* are pressed against the ring members 11*a* to 11*c* with predetermined pressing force by springs (not shown) interposed between the brushes 12*a* to 12*c* and the brush holders 13*a* to 13*c*. Each of the outer bus bars 14*a* to 14*c* extends outward along the radial direction of the input shaft 3, and then is bent so as to further extend along an axial-line direction.

As shown in FIG. 3, the units U1 to U3 are covered over by a cover 4 that is made from resin, and are mutually insulated from one another. A cooling passage 5 is formed between the units U1 to U3 and the cover 4, for cooling the brushes 12*a* to 12*c* of the units U1 to U3 by leading air in the direction of the arrow in FIG. 3. A supply of air to the cooling passage 5 is realized by external air being blown into the cooling passage 5 in a coercive manner by a component such as a fan or the like that rotates together with the input shaft 3.

As shown in FIG. 3, the input shaft 3 comprises a shaft member 3*a* and a cylindrical member 3*b* that is installed coaxially over the outer circumference of the shaft member 3*a*. Each of the ring members 11*a* to 11*c* is fixed to the outer circumferential surface of the cylindrical member 3*b*. Moreover, the inner bus bars 15 are also provided to the cylindrical member 3*b*. The inner bus bars 15 are electrically insulated from the input shaft 3 by insulating resin that is provided around the inner bus bars 15. The shaft member 3*a* is connected to the output shaft OS via the damper D. The cylindrical member 3*b* is connected to the winding rotor 2*a* by the connecting member 3*c* (refer to FIG. 1).

Figure 4:
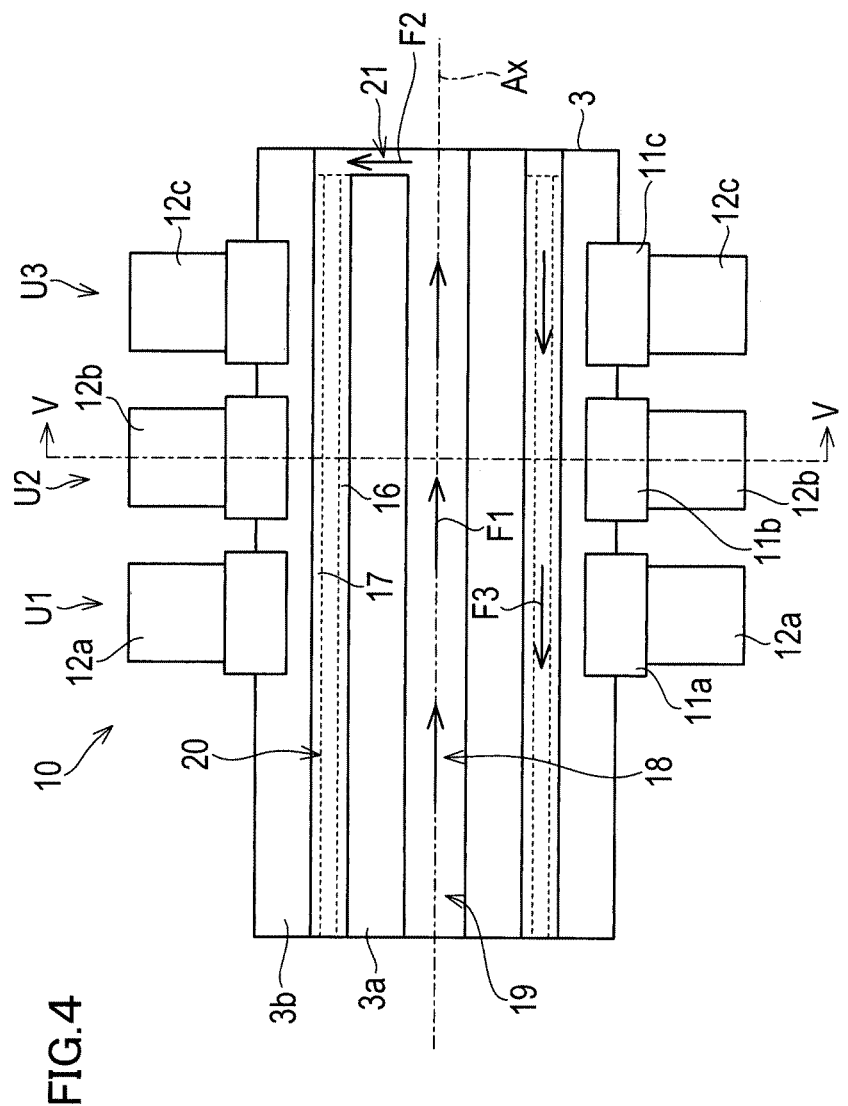
FIG. 4 is a diagram schematically showing the slip ring device.
Figure 5:
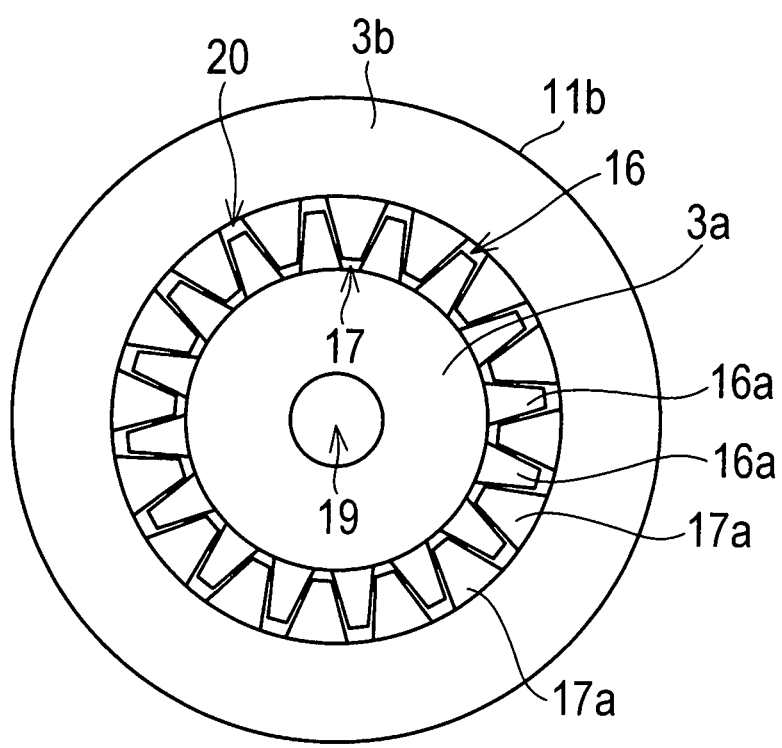
FIG. 5 is a diagram showing cross sections of a ring member and an input shaft taken along lines V-V of FIG. 4.

FIG. 4 is a schematic figure showing the surroundings of the slip ring device 10 as enlarged. And, FIG. 5 shows cross sections of the ring member 11*b* and the input shaft 3 taken along line V-V in FIG. 4. The inner bus bars 15 are omitted from these figures. As shown in these figures, an external spline portion 16 is provided upon the outer circumferential surface of the shaft member 3*a*. The external spline portion 16 includes a plurality of ridges 16*a* that extend in the axial-line direction. As shown in FIG. 5, the ridges 16*a* are provided at regular intervals around the entire outer circumferential surface of the shaft member 3*a*. Moreover, an internal spline portion 17 is provided on the inner circumferential surface of the cylindrical member 3*b*, and meshes with the external spline portion 16. The internal spline portion 17 also includes a plurality of ridges 17*a* that extend in the axial-line direction. As shown in FIG. 5, these ridges 17*a* are provided at regular intervals around the entire inner circumferential surface of the cylindrical member 3*b*, so as to mesh with the ridges 16*a* of the external spline portion 16 of the shaft member 3*a*. And, the cylindrical member 3*b* is installed over the outer circumference of the shaft member 3*a*, so that the internal spline portion 17 meshes with the external spline portion 16 thereof. The cylindrical member 3*b* and the shaft member 3*a* are splined to each other in this manner.

As shown in FIG. 4, the internal spline portion 17 is formed upon the inner circumferential surface of the cylindrical member 3*b*, so as to be provided on the radially inward side with respect to the ring members 11*a* to 11*c*. In a similar manner, the external spline portion 16 is formed upon the outer circumferential surface of the shaft member 3*a*, so as to be provided on the radially inward side with respect to the ring members 11*a* to 11*c*.

As shown in FIG. 3 and FIG. 4, in the interior of the input shaft 3, a coolant passage 18 for cooling the units U1 to U3 from the inner circumference side by flowing oil as a coolant, is provided. The coolant passage 18 comprises a first flow passage 19, a second flow passage 20, and a connection passage 21 that connects together the first flow passage 19 and the second flow passage 20. The first flow passage 19 is provided in the central portion of the shaft member 3*a* so as to extend along the axial-line direction. Moreover, the first flow passage 19 is provided so as to pass through the radially inward side with respect to the ring members 11*a* to 11*c*. The second flow passage 20 consists of a space that is formed between the shaft member 3*a* and the cylindrical member 3*b* due to the provision of the external spline portion 16 and the internal spline portion 17. Due to this, the second flow passage 20 is provided around the entire external circumference of the shaft member 3*a*. Moreover, the second flow passage 20 is provided so as to extend along the axial-line direction. As shown in FIGS. 3 and 4, the second flow passage 20 is radially located between the first flow passage 19 and the ring members 11*a* through 11*c*. And, as shown in FIG. 3, one end portion of the first flow passage 19 is located on the radially inward side with respect to the ring member 11*c*, which is the one of the three ring members 11*a* through 11*c* that is located closest to the engine. And the connection passage 21 extends in the radially outward direction from the end portion of this first flow passage 19 up to the second flow passage 20. Due to this, the connection passage 21 is located on the radially inward side with respect to the ring member 11*c*, just like the one end portion of the first flow passage 19. However in FIG. 4, for convenience, the end portion of the first flow passage 19 and the connection passage 21 are shown as being positioned more towards the engine than the ring members 11*a* through 11*c*.

As shown in FIG. 3, oil is supplied to the first flow passage 19 from an oil pump 22. This oil supplied to the first flow passage 19 then flows through the first flow passage 19, as shown by an arrow F1, from the automatic transmission side (i.e. the left side in FIG. 3) towards the engine side (i.e. the right side in FIG. 3). And the oil is then led from the first flow passage 19 into the second flow passage 20 via the connection passage 21, as shown by an arrow F2. Thereafter, the oil flows within the second passage 20 as shown by an arrow F3 from the engine side towards the automatic transmission side, and is finally discharged to the exterior of the input shaft 3. The discharged oil is then collected in an oil tank not shown in the figures, and is recirculated back to the oil pump 22 and is again supplied to the first flow conduit 19. By circulating the oil in this manner, the oil pump 22 functions as a "coolant supply device" of the present invention.

Since, with this cooling structure according to the first embodiment of the present invention, the internal spline portion 17 is provided up to a portion of the inner circumferential surface of the cylindrical member 3b that lies on the radially inward side with respect to the ring members 11a through 11c, accordingly it is possible to increase a heat exchange area between the cylindrical member 3b and the oil. Moreover, by providing the internal spline portion 17 at the portion like this, it is possible to promote cooling of the portion of the input shaft 3 lying the radially inward side with respect to the ring members 11a through 11c. Yet further, by providing the spline portions 16 and 17 at the portion like this and meshing them together, it is possible to make the shaft member 3a and the cylindrical member 3b contact together at the radially inward side with respect to the ring members 11a through 11c. And it is possible to transfer heat to the shaft member 3a from the cylindrical member 3b via these contact portions thereof. Due to this, it is possible to promote the transfer of heat from the cylindrical member 3b to the shaft member 3a. Since it is possible to promote heat dissipation from the ring members 11a through 11c by the above construction, accordingly it is possible to reduce the temperatures of the ring members 11a through 11c. And, due to this, it is possible to reduce the temperatures of the brushes 12a through 12c. Moreover, because of this, it is possible to improve the cooling performance of the ring members 11a through 11c and of the brushes 12a through 12c. As is per se well known, the amounts of wear upon the brushes 12a through 12c increase as the temperatures of the brushes 12a through 12c become higher. Due to this, it is possible to reduce the amounts of wear upon the brushes 12a through 12c by reducing the temperatures of the brushes 12a through 12c.

Furthermore since, in this first embodiment, the external spline portion 16 and the internal spline portion 17 are provided up to the portion of the radially inward side with respect to the ring members 11a through 11c, accordingly it is possible for the mutual engagement of the shaft member 3a and the cylindrical member 3b to be implemented by these spline portions 16 and 17 as well. Due to this, it is possible to reduce the size of the physical structure of the cylindrical member 3b in the axial-line direction.

Second Embodiment

Figure 6:
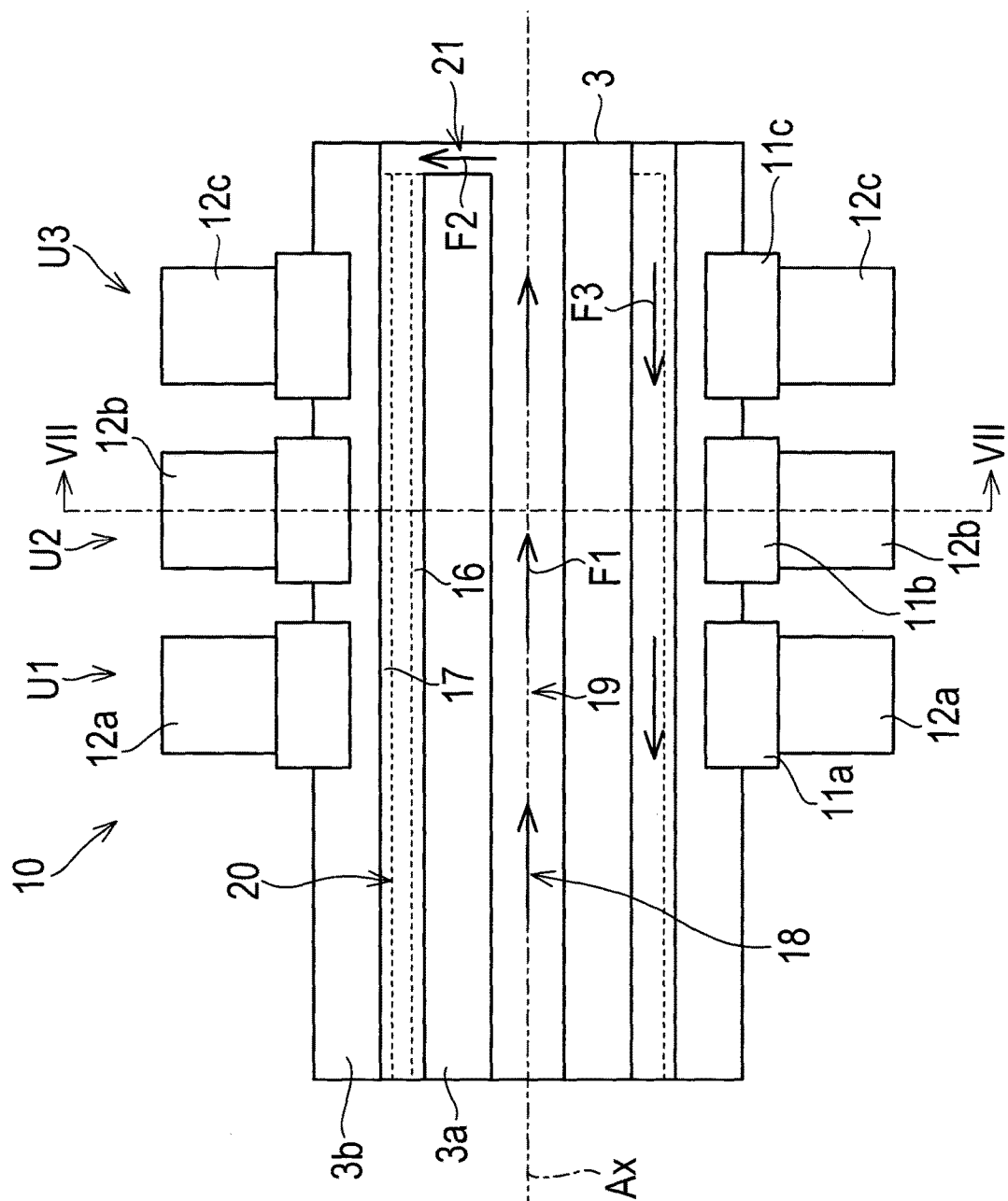
FIG. 6 is a diagram schematically showing a slip ring device to which a cooling structure according to a second embodiment of the present invention is applied.
Figure 7:
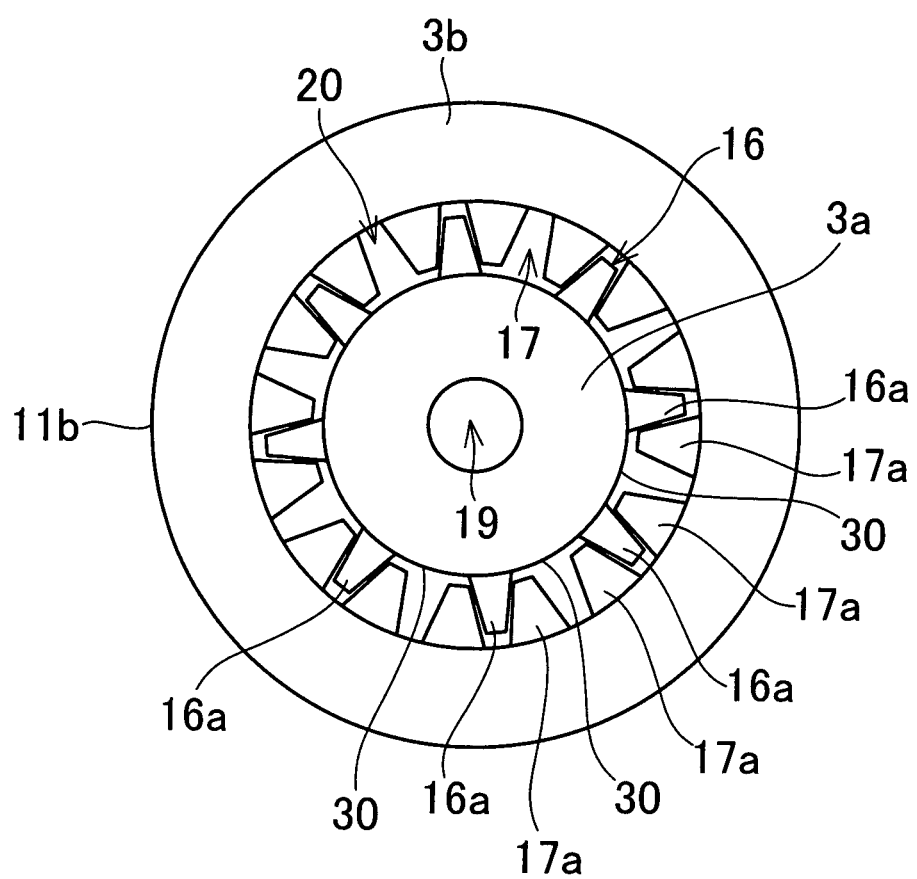
FIG. 7 is a diagram showing cross sections of a ring member and an input shaft taken along lines VII-VII of FIG. 6.

Next, a second embodiment of the cooling structure of the present invention will be explained with reference to FIGS. 6 and 7. Here, to portions of this embodiment that are the same as portions of the first embodiment, the same reference symbols are affixed, and explanation thereof will be omitted. FIG. 6 is a figure corresponding to FIG. 4 for the first embodiment. And FIG. 7 shows cross sections of the ring member 11b and the input shaft 3 taken along line VII-VII in FIG. 6. As shown in these figures, in this embodiment, the external spline portion 16 is different from the one in the first embodiment. Apart from this, the other structures are the same as in the first embodiment. Due to this, FIGS. 1 through 3 will be referred to in the description of the compound motor 1 of this embodiment as well.

As shown in FIG. 7, in this embodiment, missing spline portions 30 are provided to the external spline portion 16 of the shaft member 3a. And, as shown in this figure, one ridge 16a is lacked for each of the missing spline portions 30. Moreover, the ridge 16a and the missing spline portion 30 are provided alternatingly around the outer circumferential surface of the shaft member 3a in the circumferential direction. Due to this, in this embodiment, when the external spline portion 16 and the internal spline portion 17 are meshed with each other, a portion where a ridge 16a of the external spline portion 16 is present and a portion where no ridge 16a is present are provided alternatingly in the circumferential direction, each of those portions existing between neighboring ridges 17a of the internal spline portion 17.

Since, in this embodiment as well, in a similar manner to the case of the first embodiment, the internal spline portion 17 is provided to the radially inward side with respect to the ring members 11a through 11c, accordingly it is possible to reduce the temperatures of the ring members 11a through 11c. Moreover, since due to this it is possible to reduce the temperatures of the brushes 12a through 12c, accordingly it is possible to reduce the amounts of wear upon the brushes 12a through 12c.

Furthermore, since in this embodiment the missing spline portions 30 are provided to the external spline portion 16, accordingly it becomes hard to impede convection of the flow of oil in the second flow passage 20. Due to this, it is possible to promote dissipation of heat by this convection. Moreover, since it is possible to reduce the resistance to the flow of oil by providing the missing spline portions 30 in this manner, accordingly it is possible to reduce load upon the oil pump 22. Due to this, it is possible to enhance energy efficiency of the drive system as a whole, since it is possible to reduce consumption of energy by the oil pump 22.

Third Embodiment

Figure 8:
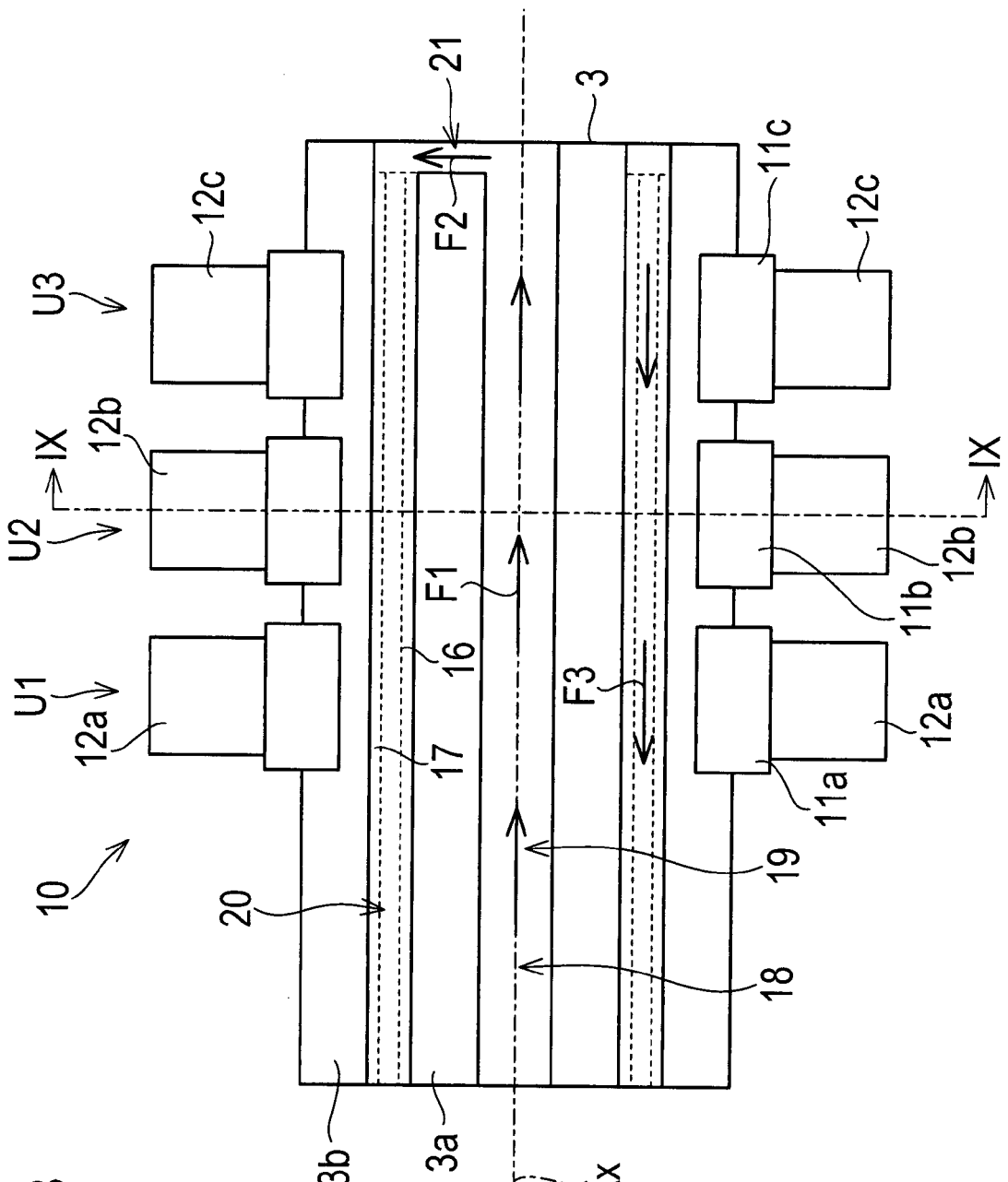
FIG. 8 is a diagram schematically showing a slip ring device to which a cooling structure according to a third embodiment of the present invention is applied.
Figure 9:
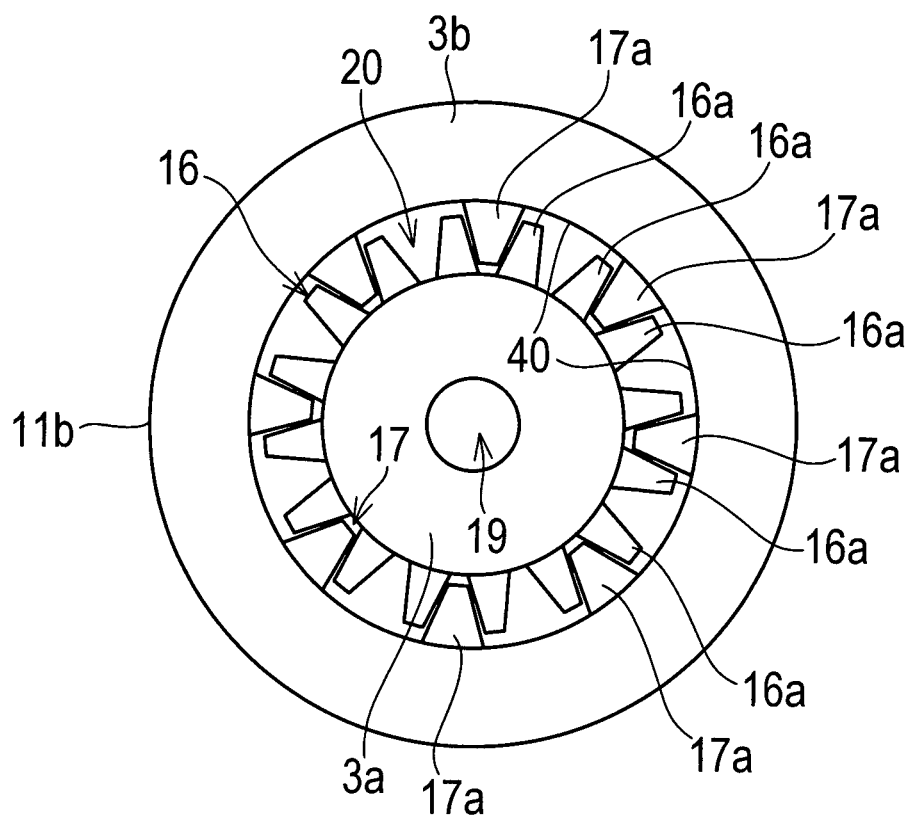
FIG. 9 is a diagram showing cross sections of a ring member and an input shaft taken along lines IX-IX of FIG. 8.

Next, a third embodiment of the cooling structure of the present invention will be explained with reference to FIGS. 8 and 9. Here, to portions of this embodiment that are the same as portions of the first embodiment, the same reference symbols are affixed, and explanation thereof will be omitted. FIG. 8 is a figure corresponding to FIG. 4 for the first embodiment. And FIG. 9 shows cross sections of the ring member 11b and the input shaft 3 taken along line IX-IX in FIG. 8. As shown in these figures, in this embodiment, the internal spline portion 17 is different from the one in the first embodiment. Apart from this, the other structures are the same as in the first embodiment. Due to this, FIGS. 1 through 3 will be referred to in the description of the compound motor 1 of this embodiment as well.

As shown in FIG. 9, in this embodiment, missing spline portions 40 are provided to the internal spline portion 17 of the cylindrical member 3b. And, as shown in this figure, one ridge 17a is lacked for each of the missing spline portions 40. Moreover, the ridge 17a and the missing spline portion 40 are provided alternatingly around the inner circumferential surface of the cylindrical member 3b in the circumferential direction. Due to this, in this embodiment, when the external spline portion 16 and the internal spline portion 17 are meshed with each other, a portion where a ridge 17a of the internal spline portion 17 is present and a portion where no ridge 17a is present are provided alternatingly in the circumferential direction, each of the portions existing between neighboring ridges 16a of the external spline portion 16.

Since, in this embodiment as well, in a similar manner to the case of the first embodiment, the internal spline portion 17 is provided to the radially inward side with respect to the ring members 11a through 11c, accordingly it is possible to reduce the temperatures of the ring members 11a through 11c. Moreover, since due to this it is possible to reduce the temperatures of the brushes 12a through 12c, accordingly it is possible to reduce the amounts of wear upon the brushes 12a through 12c.

Furthermore since, in this embodiment, in a similar manner to the second embodiment, it is hard to impede convection of the flow of oil in the second flow passage 20, accordingly it is possible to promote dissipation of heat. Moreover, since it is possible to reduce the resistance to the flow of oil, accordingly it is possible to reduce load upon the oil pump 22. Due to this, it is possible to enhance energy efficiency of the drive system.

Fourth Embodiment

Figure 10:
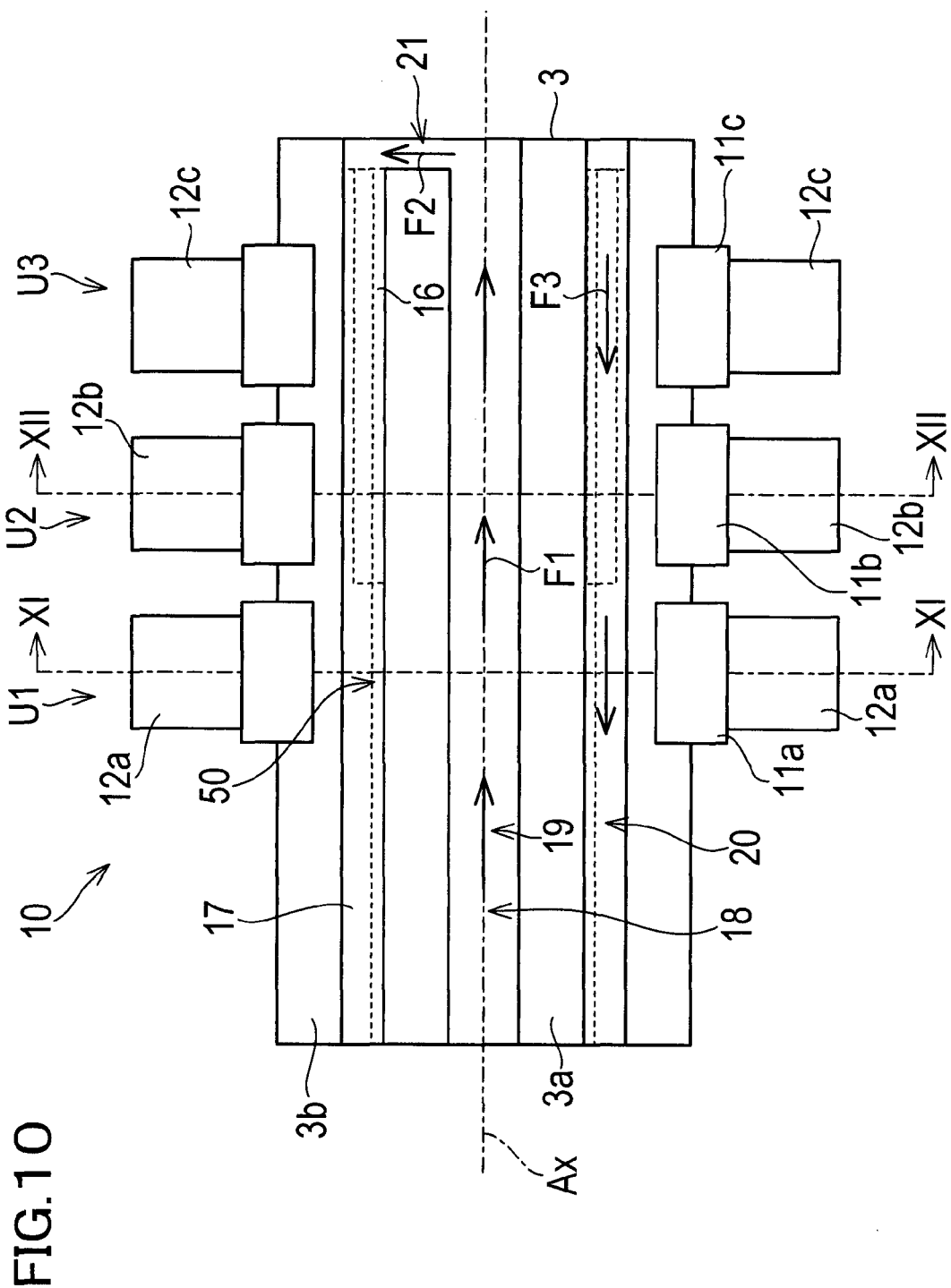
FIG. 10 is a diagram schematically showing a slip ring device to which a cooling structure according to a fourth embodiment of the present invention is applied.
Figure 11:
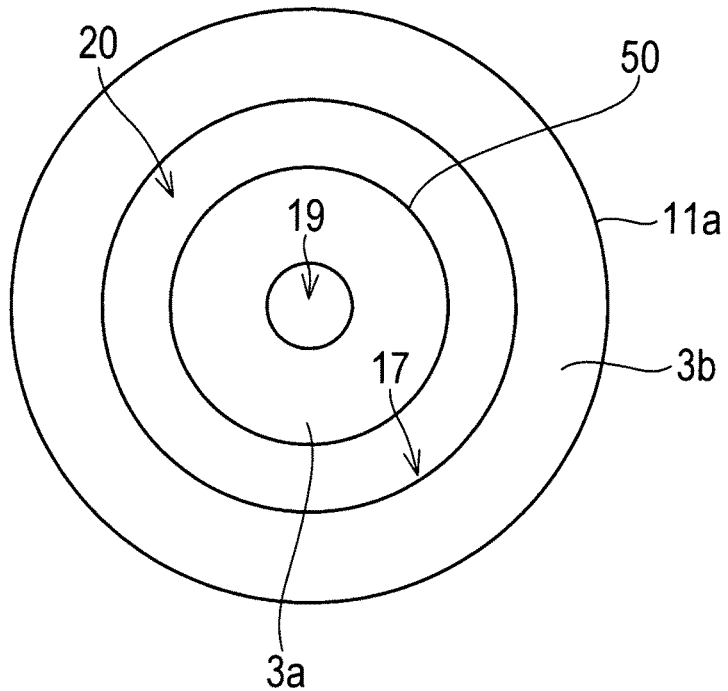
FIG. 11 is a diagram showing cross sections of a ring member and an input shaft taken along lines XI-XI of FIG. 10.
Figure 12:
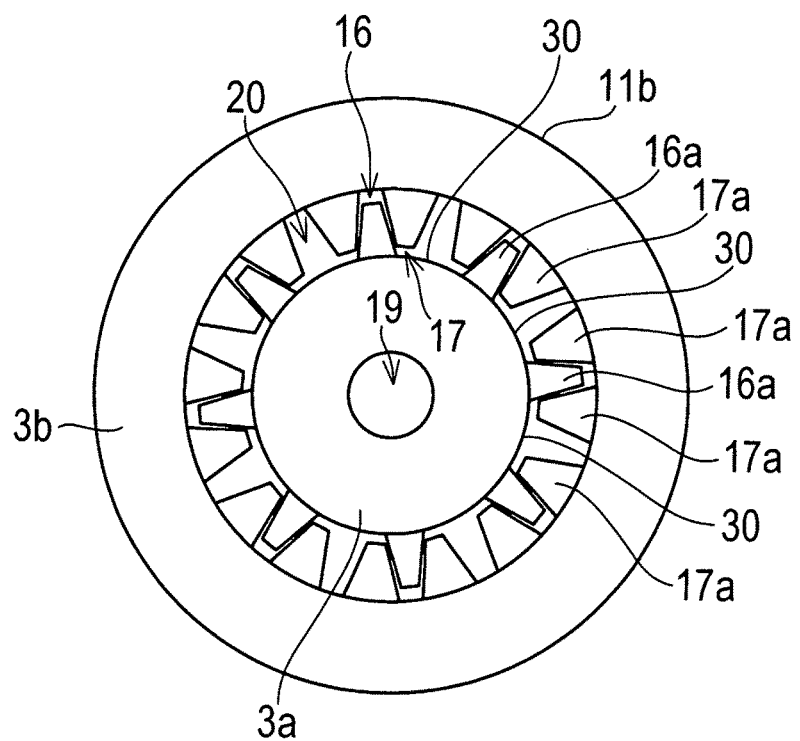
FIG. 12 is a diagram showing cross sections of the ring member and the input shaft taken along lines XII-XII of FIG. 10.

Next, a fourth embodiment of the cooling structure of the present invention will be explained with reference to FIGS. 10 and 12. Here, to portions of this embodiment that are the same as portions of the above mentioned embodiments, the same reference symbols are affixed, and explanation thereof will be omitted. FIG. 10 is a figure corresponding to FIG. 4 for the first embodiment. And FIG. 11 shows cross sections of the ring member 11a and the input shaft 3 taken along line XI-XI in FIG. 10. Moreover, FIG. 12 shows cross sections of the ring member 11b and the input shaft 3 taken along line XII-XII in FIG. 10. Although cross sections of the ring member 11c and the input shaft 3 are not shown in the figure, it should be understood that the cross sections are the same as the cross sections of the ring member 11b and of the input shaft 3 shown in FIG. 12. Moreover, the internal spline portion 17 is omitted from FIG. 11. As shown in these figures, in this embodiment, the external spline portion 16 is different from the one in the first embodiment. Apart from this, the other structures are the same as in the first embodiment. Due to this, FIGS. 1 through 3 will be referred to in the description of the compound motor 1 of this embodiment as well.

In this compound motor 1, when during operation the input shaft 3 rotates, heat is generated by friction between the ring members 11a through 11c and the brushes 12a through 12c. At this time temperature differences are set up between the units U1 through U3, since as shown in FIG. 3 the environment surrounding the units U1 through U3 is not uniform. Since the second stage unit U2 is positioned between the first stage unit U1 and the third stage unit U3, accordingly it can more easily incubate heat. In particular since, as shown in FIG. 3, the air that flows in the cooling passage 5 proceeds from the first stage unit U1 towards the third stage unit U3, accordingly, after this air has been warmed by exchanging heat with the first stage unit U1, the air warmed it is led to the second stage unit U2. Furthermore since, as shown in FIG. 3, the third stage unit U3 and outer portions that are capable of heat exchange are close to one another, accordingly significant heat exchange with these outer portions is performed. Due to this type of reason, the second stage unit U2 has a characteristic that its temperature can easily rise to be higher, as compared with the first stage unit U1 and the third stage unit U3. And, since the first stage unit U1 is cooled by air at a lower temperature than the air that cools the third stage unit U3, accordingly the third stage unit U3 has a characteristic that its temperature can easily rise to be higher, as compared with the first stage unit U1.

In this embodiment, as shown in FIGS. 10 and 11, a missing spline range 50 where the ridges 16a of the external spline portion 16 are lacked in the circumferential direction is provided on the radially inward side with respect to the ring member 11a of the first stage unit U1. As described above, it is considered that, when the compound motor 1 is operating, among the three ring members 11a through 11c, it is the ring member 11a of the first stage unit U1 whose temperature will become the lowest. Thus, in this embodiment, no ridge 16a of the external spline portion 16 is provided at the portion that lies on the radially inward side with respect to the ring member 11a whose temperature will become the lowest during operation of the compound motor 1. By contrast, an external spline portion 16 is provided at the portion that lies on the radially inward side with respect to the ring member 11b of the second stage unit U2 and the ring member 11c of the third stage unit U3. Furthermore, the external spline portion 16 is also provided upon a portion of the outer circumferential surface of the shaft member 3a further left in the figure than the portion that is located on the radially inward side with respect to the ring member 11a of the first stage unit U1, and this external spline portion 16 is meshed with the internal spline portion 17, but this feature is not illustrated in FIG. 10. Yet further, the external spline portion 16 is also provided on the portion of the outer circumferential surface of the shaft member 3a that is omitted from FIG. 10, and is meshed with the internal spline portion 17.

Since, according to this embodiment, the external spline portion 16 is provided on the radially inward side with respect to the ring member 11b of the second stage unit U2 and the ring member 11c of the third stage unit U3, accordingly it is possible to promote cooling of these ring members 11b and 11c. Due to this, it is possible to reduce the temperatures of these ring members 11b and 11c. And, due to this, it is possible to reduce the temperatures of the brushes 12b and 12c. On the other hand, since no external spline portion 16 is provided on the radially inward side with respect to the ring member 11a of the first stage unit U1, accordingly cooling of this ring member 11a with oil is suppressed, as compared with the other ring members 11b and 11c. However, as described above, the temperature of the first stage unit U1 can easily become lower, as compared with the temperatures of the other units U2 and U3. Due to this, it is possible to reduce the temperature differences between the three ring members 11a through 11c by suppressing cooling with oil in this manner. And since, due to this, it is possible to reduce the temperature differences between the brushes 12a through 12c of the units U1 through U3, accordingly it is possible to reduce the variation in the amounts of wear of the brushes 12a through 12c.

Furthermore, by providing the missing spline ranges 50 in this manner, it is possible to reduce the resistance to the flow of oil in the second flow passage 20. Since, due to this, it is possible to reduce load upon the oil pump 22, accordingly it is possible to enhance energy efficiency of the drive system.

It should be understood that while, in FIGS. 10 through 12, a case was shown in which the ridges 16a of the external spline portion 16 was eliminated in the missing spline range 50, it would also be acceptable to eliminate the ridges 17a of the internal spline portion 17 in the missing spline range 50, instead of eliminating the ridges 16a of the external spline portion 16. In this case as well, in a similar manner to that described above, it is possible to reduce differences in temperature between the brushes 12a through 12c of the units U1 through U3. And, due to this, it is possible to reduce the variation in the amounts of wear of the brushes 12a through 12c. Moreover, if it is desired to make difference in cooling performance between the first stage unit U1 and the other units U2 and U3 further greater, then it would be acceptable to eliminate both the ridges 16a of the external spline portion 16 and also the ridges 17a of the internal spline portion 17 at the missing spline range 50. For example, if it is considered that the temperatures of the other units U2 and U3 can easily rise as compared with the temperature of the first stage unit U1, then it is possible to reduce the temperature differences between the brushes 12a through 12c of the units U1 through U3 by eliminating both ridges 16a, 17a of the spline portions 16 and 17 in this way.

Furthermore although, in the fourth embodiment described above, as shown in FIG. 12, the missing spline portions 30 are provided upon the external spline portion 16, it would also be acceptable to provide the missing spline portions 40 upon the internal spline portion 17 instead of the external spline portion 16. Furthermore, it would also be acceptable to provide the missing spline portions upon both the external spline portion 16 and the internal spline portion 17; or, alternatively, it would also be acceptable not to provide the missing spline portions upon either of them.

Fifth Embodiment

Figure 13:
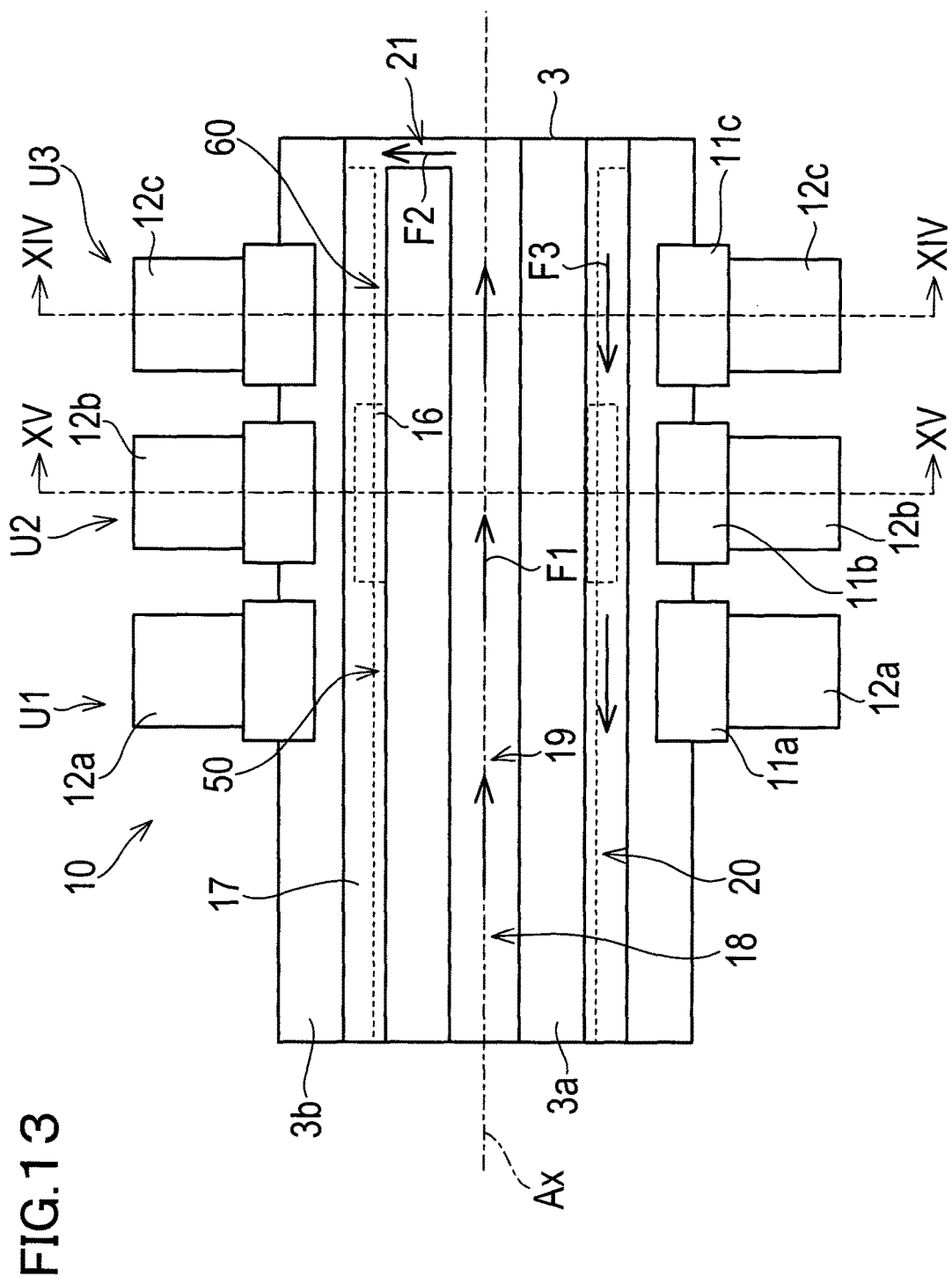
FIG. 13 is a diagram schematically showing a slip ring device to which a cooling structure according to a fifth embodiment of the present invention is applied.
Figure 14:
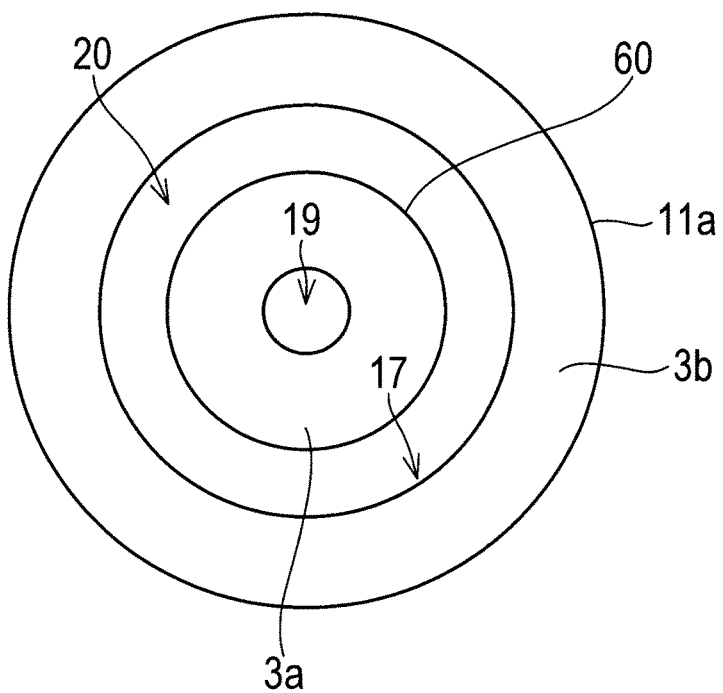
FIG. 14 is a diagram showing cross sections of a ring member and an input shaft taken along lines XIV-XIV of FIG. 13.
Figure 15:
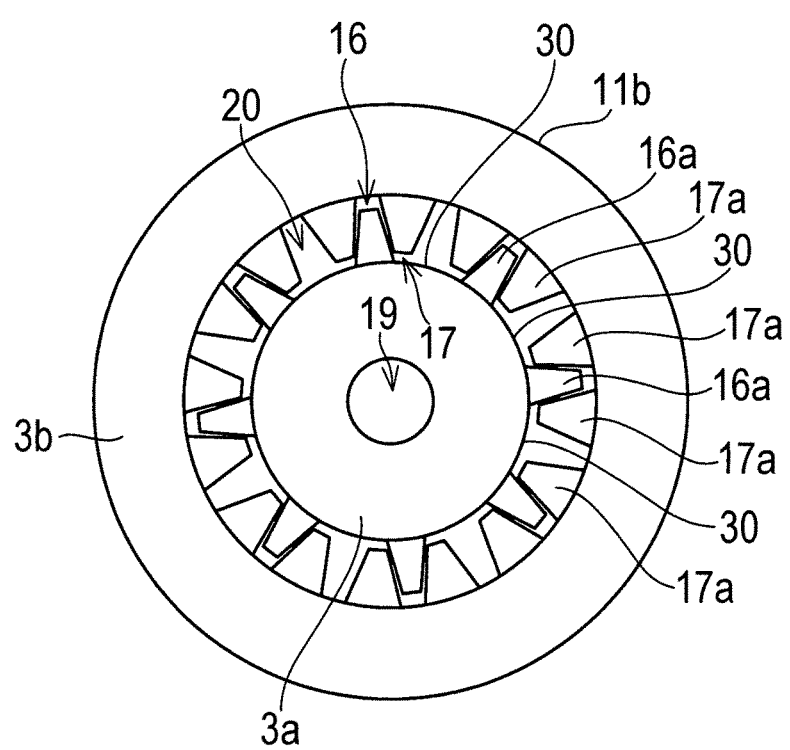
FIG. 15 is a diagram showing cross sections of the ring member and the input shaft taken along lines XV-XV of FIG. 13.

Next, a fifth embodiment of the cooling structure of the present invention will be explained with reference to FIGS. 13 through 15. Here, to portions of this embodiment that are the same as portions of the above mentioned embodiments, the same reference symbols are affixed, and explanation thereof will be omitted. FIG. 13 is a figure corresponding to FIG. 4 for the first embodiment. And FIG. 14 shows cross sections of the ring member 11c and the input shaft 3 taken along line XIV-XIV in FIG. 13. Moreover, FIG. 15 shows cross sections of the ring member 11b and the input shaft 3 taken along line XV-XV in FIG. 13. It should be understood that the cross sections of the ring member 11a and the input shaft 3 are the same as in the case of FIG. 12 for the fourth embodiment described above. Moreover, the internal spline portion 17 is omitted from FIG. 14. As shown in these figures, in this embodiment, the external spline portion 16 is different from the one in the first embodiment. Apart from this, the other structures are the same as in the first embodiment. Due to this, FIGS. 1 through 3 will be referred to in the description of the compound motor 1 of this embodiment as well.

As described above, it is a notable characteristic that, during operation of the compound motor 1, the second stage unit U2 can easily attain the highest temperature, as compared with the first stage unit U1 and the third stage unit U3. Thus, in this embodiment, as shown in FIGS. 13 through 15, along with providing a missing spline range 50 in the circumferential direction on the radially inward side with respect to the ring member 11a of the first stage unit U1, also a missing spline range 60 is provided in the circumferential direction on the radially inward side with respect to the ring member 11c of the third stage unit U3. In these missing spline ranges 50, 60, ridges 16a of the external spline portion 16 are lacked in the circumferential direction upon the outer circumferential surface of the shaft member 3a. Due to this, in this embodiment, among the portion lying on the radially inward side with respect to the three ring members 11a through 11c, the external spline portion 16 is provided on the radially inward side with respect to only the ring member 11b of the second stage unit U2. Moreover, the external spline portion 16 is also provided upon a portion of the outer circumferential surface of the shaft member 3a that lies further left in the figure than the portion lying on the radially inward side with respect to the ring member 11a of the first stage unit U1, and this external spline portion 16 is meshed with the internal spline portion 17, but this feature is not illustrated in FIG. 13. Furthermore, the external spline portion 16 is also provided upon a portion of the outer circumferential surface of the shaft member 3a that is not omitted in FIG. 13, and this external spline portion 16 is meshed with the internal spline portion 17 there.

Since, according to this fifth embodiment, the external spline portion 16 is provided on the radially inward side with respect to the ring member 11b of the second stage unit U2, accordingly it is possible to promote the cooling of this ring member 11b. Since, due to this, it is possible to reduce the temperature of the ring member 11b, accordingly it is possible to reduce the temperature of the brushes 12b. On the other hand, since no ridges 16a of the external spline portion 16 are provided on the radially inward sides with respect to the ring member 11a of the first stage unit U1 and the ring member 11c of the third stage unit U3, accordingly cooling these ring members 11a and 11c by oil is suppressed, as compared with the ring member 11b. When the temperature of the second stage unit U2 becomes extremely high as compared with the temperatures of the other units U1 and U3, it is possible to make the temperature differences between the three ring members 11a through 11c low by providing the missing spline ranges 50 and 60 in this manner. Since, due to this, it is possible to reduce the temperature differences between the brushes 12a through 12c, accordingly it is possible to reduce variations between the amounts of wear upon the brushes 12a through 12c.

Furthermore, by providing the missing spline ranges 50 and 60 in this manner, it is possible to reduce the resistance to the flow of oil in the second flow passage 20. Since, due to this, it is possible to reduce load upon the oil pump 22, accordingly it is possible to enhance energy efficiency of the drive system.

It should be understood that while, in FIGS. 13 through 15, the ridges 16a of the external spline portion 16 are eliminated in the missing spline axial ranges 50 and 60, it would also be acceptable to arrange to eliminate the ridges 17a of the internal spline portion 17 in the missing spline ranges 50 and 60, instead of the ridges 16a of the external spline portion 16. In this case as well, in a similar manner to the case with the embodiment described above, it is possible to reduce the temperature differences between the brushes 12a through 12c of the units U1 through U3. Due to this, it is possible to reduce variations between the amounts of wear upon the brushes 12a through 12c. Moreover, if it is desired to make the differences in cooling performance between the second stage unit U2 and the other units U1 and U3 further greater, then it would be possible to eliminate both of the ridges 16a of the external spline portion 16 and the ridges 17a of the internal spline portion 17 at the missing spline ranges 50 and 60.

Moreover while, in the fifth embodiment described above, the missing spline portions 30 are provided upon the external spline portion 16 as shown in FIG. 15, it would also be possible to provide the missing spline portions 40 upon the internal spline portion 17 instead of the external spline portion 16. Furthermore, it would be possible to provide the missing spline portions upon both the external spline portion 16 and the internal spline portion 17; or, alternatively, it would be possible to provide neither of these missing spline portions.

Sixth Embodiment

Figure 16:
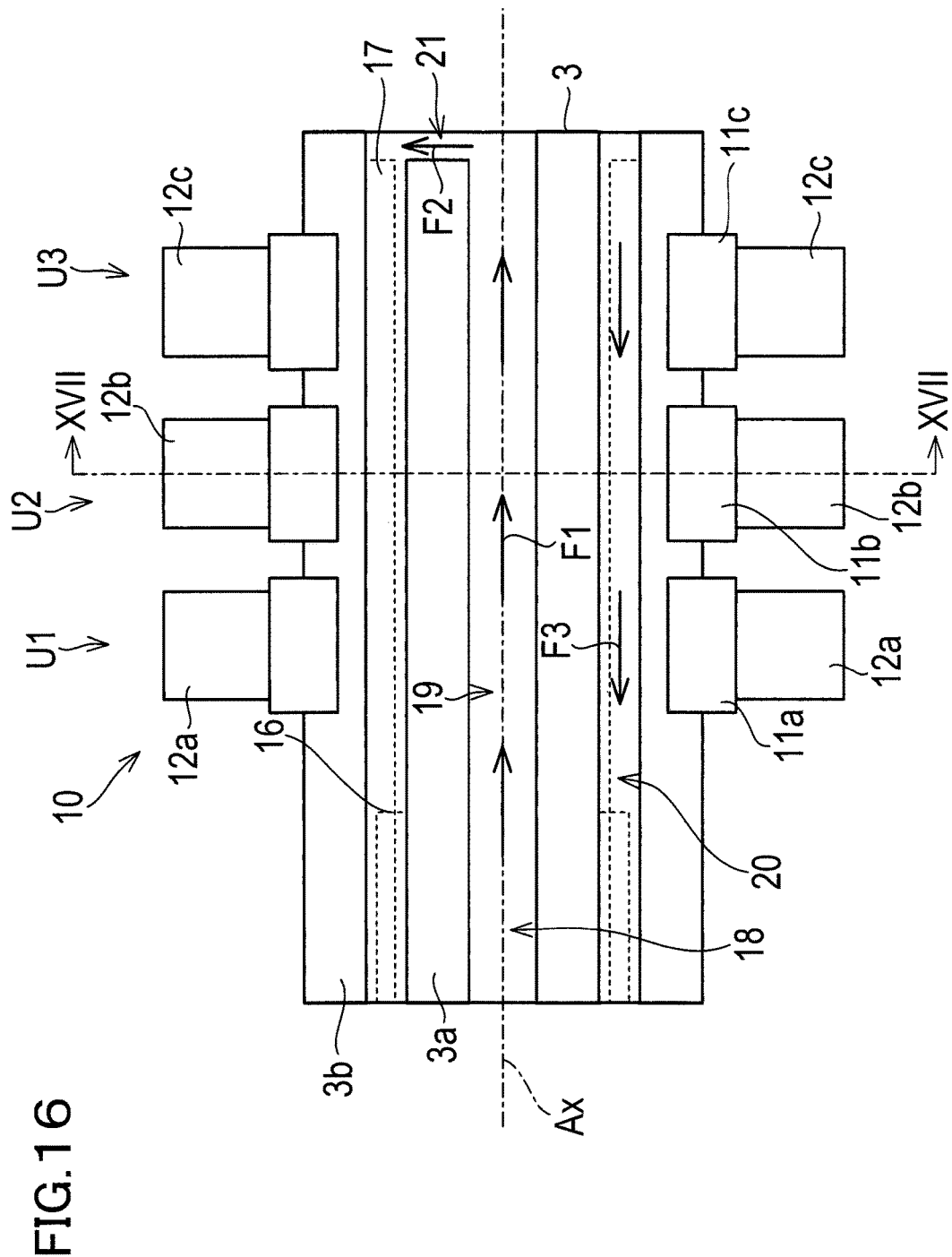
FIG. 16 is a diagram schematically showing a slip ring device to which a cooling structure according to a sixth embodiment of the present invention is applied.
Figure 17:
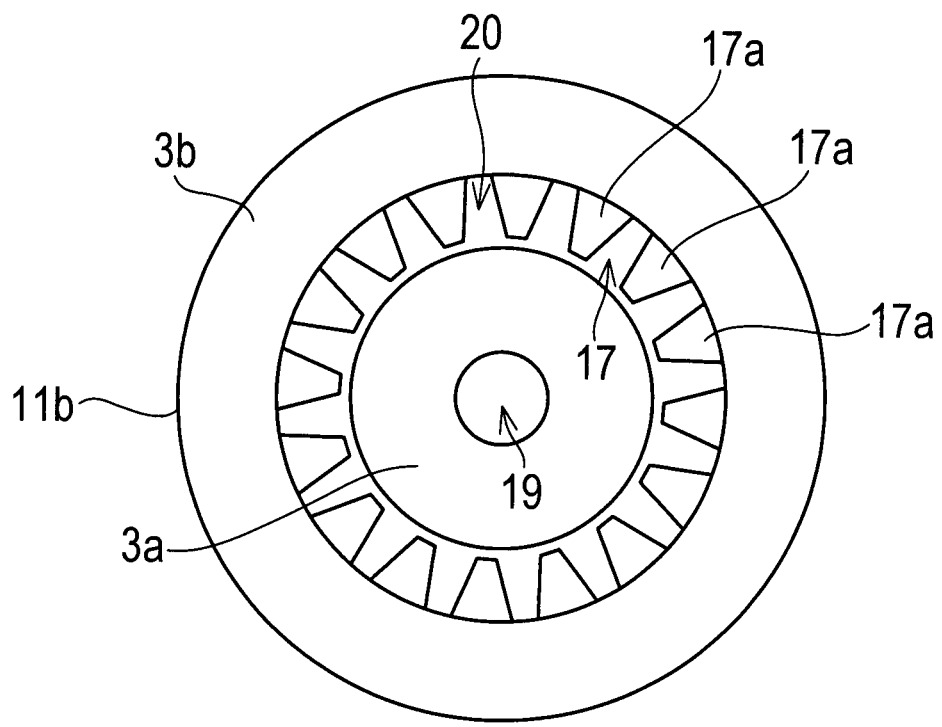
FIG. 17 is a diagram showing cross sections of a ring member and an input shaft taken along lines XVII-XVII of FIG. 16.

Next, a sixth embodiment of the cooling structure of the present invention will be explained with reference to FIGS. 16 and 17. Here, to portions of this embodiment that are the same as portions of the above mentioned embodiments, the same reference symbols are affixed, and explanation thereof will be omitted. FIG. 16 is a figure corresponding to FIG. 4 for the first embodiment. And FIG. 17 shows cross sections of the ring member 11b and the input shaft 3 taken along line XVII-XVII in FIG. 16. As shown in these figures, in this embodiment, the external spline portion 16 is different from the one in the first embodiment. Apart from this, the other structures are the same as in the first embodiment. Due to this, FIGS. 1 through 3 will be referred to in the description of the compound motor 1 of this embodiment as well.

As shown in FIGS. 16 and 17, in this embodiment, no ridges 16a of the external spline portion 16 are provided to the portion upon the outer circumferential surface of the shaft member 3a that lies on the radially inward side with respect to the ring members 11a through 11c of the units U1 through U3. On the other hand, the internal spline portion 17 is provided at these portions.

Since, according to this embodiment, the internal spline portion 17 is provided on the radially inward side with respect to the ring members 11a through 11c, accordingly it is possible to increase the heat exchange area between the Cylindrical member 3b and the oil. Due to this, it is possible to reduce the temperatures of the ring members 11a through 11c. Moreover, due to this, it is possible to reduce the temperatures of the brushes 12a through 12c. Accordingly, it is possible to reduce the amounts of wear upon the brushes 12a through 12c.

Moreover since, in this embodiment, the portion of the shaft member 3a that lies on the radially inward side with respect to the ring members 11a through 11c is not employed for transmission of power, accordingly it is possible to reduce the diameter of these portions of the shaft member 3a. Due to this, it is possible to reduce the size of the physical structure of the slip ring device 10 in the radial direction.

Seventh Embodiment

Figure 18:
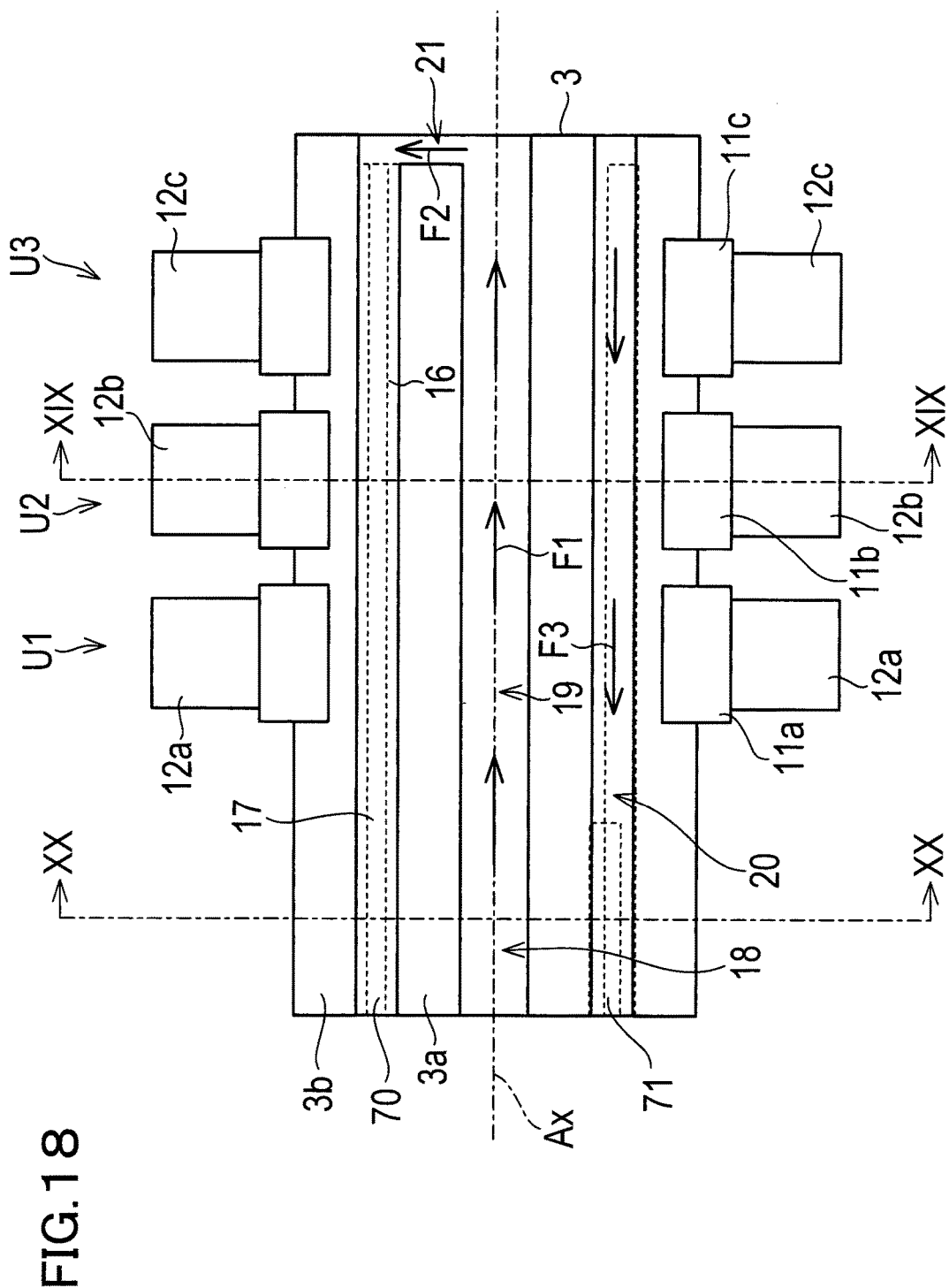
FIG. 18 is a diagram schematically showing a slip ring device to which a cooling structure according to a seventh embodiment of the present invention is applied.
Figure 19:
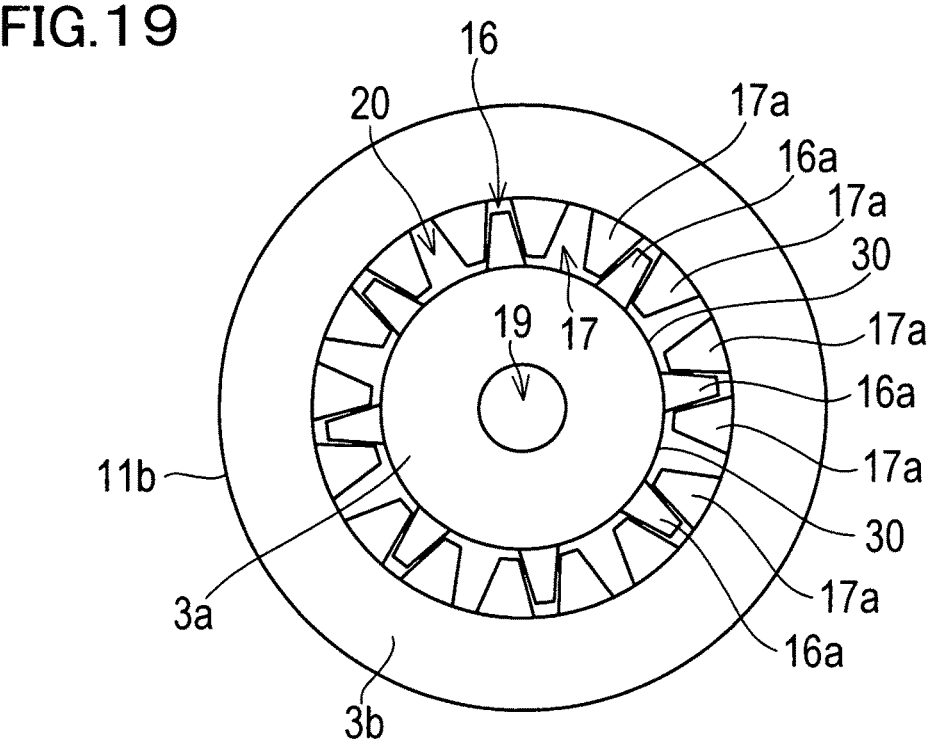
FIG. 19 is a diagram showing cross sections of a ring member and an input shaft taken along lines XIX-XIX of FIG. 18.
Figure 20:
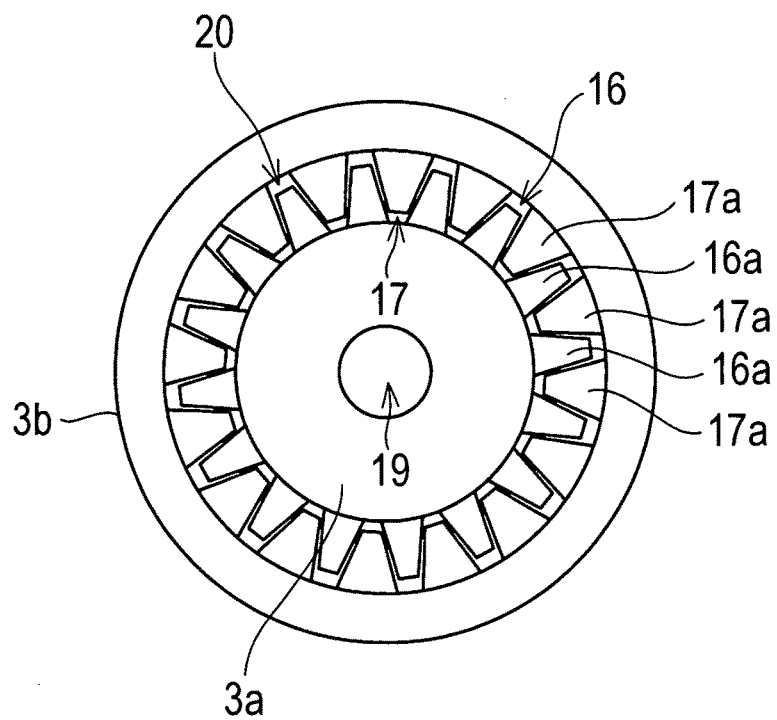
FIG. 20 is a diagram showing a cross section of the input shaft taken along lines XX-XX of FIG. 18.

Next, a seventh embodiment of the cooling structure of the present invention will be explained with reference to FIGS. 18 through 20. Here, to portions of this embodiment that are the same as portions of the above mentioned embodiments, the same reference symbols are affixed, and explanation thereof will be omitted. FIG. 18 is a figure corresponding to FIG. 4 for the first embodiment. And FIG. 19 shows cross sections of the ring member 11b and the input shaft 3 taken along line XIX-XIX in FIG. 18. Moreover, FIG. 20 shows a cross section of the input shaft 3 taken along lines XX-XX in FIG. 18. As shown in these figures, in this embodiment, the external spline portion 16 is different from the one in the first embodiment. Apart from this, the other structures are the same as in the first embodiment. Due to this, FIGS. 1 through 3 will be referred to in the description of the compound motor 1 of this embodiment as well.

In this embodiment, as shown in FIG. 20, at portions on the outer circumferential surface of the shaft member 3a that do not lie on the radially inward side with respect to the ring members 11a through 11c, the ridges 16a of the external spline portion 16 are formed so that the ridges 16a are inserted into all apertures respectively, each aperture existing between the ridges 17a of the internal spline portion 17. On the other hand, as shown in FIG. 19, at the portions that lies on the radially inward side with respect to the ring members 11a through 11c, the missing spline portions 30 are provided to the external spline portion 16, so that, a place where a ridge 16a of the external spline portion 16 is present between neighboring ridges 17a of the internal spline portion 17a, and a place where no ridge 16a is present between neighboring ridges 17a are provided alternatingly in the circumferential direction. In other words, in this embodiment, the ridges 16a of the external spline portion 16 include ridges 70 and ridges 71. The ridges 70 are provided over almost the entire length of the second flow passage 20, while the ridges 71 are provided only at the portions of the second flow passage 20, the portion lying not on the radially internal side of the ring members 11a through 11c. And these ridges 70 and 71 are provided alternatingly around the circumferential direction.

Since, according to this embodiment, the internal spline portion 17 is provided on the radially inward side with respect to the ring members 11a through 11c, accordingly it is possible to increase the heat exchange area between the cylindrical member 3b and the oil. Due to this, it is possible to reduce the temperatures of the ring members 11a through 11c. Moreover, since due to this it is possible to reduce the temperatures of the brushes 12a through 12c, accordingly it is possible to reduce the amounts of wear upon the brushes 12a through 12c.

Furthermore, since in this embodiment the missing spline portions 30 are provided to the external spline portion 16 at portions that lie on the radially inward side with respect to the ring members 11a through 11c, accordingly it becomes difficult to impede convection of the flow of oil in the second flow passage 20. Due to this, it is possible to promote dissipation of heat by this convection. Moreover, since load upon the oil pump 22 is reduced, accordingly it is possible to enhance energy efficiency of the drive system.

Yet further, in this embodiment, the transmission of power between the shaft member 3a and the cylindrical member 3b is principally performed by their portions that do not lie on the radially inward side with respect to the ring members 11a through 11c. In this case, since it is possible to make the torque that is applied to the portion of the input shaft 3 that lies on the radially inward side with respect to the ring members 11a through 11c small, accordingly it is possible to make the diameters of these portions small. Moreover, since due to this the diameters of the ring members 11a through 11c can be made small, accordingly the lengths of the external circumferences of these ring members 11a through 11c can be made small. And since, due to this, the distances through which the brushes 12a through 12c slide can be made smaller, accordingly it is possible to reduce the amounts of wear upon the brushes 12a through 12c. Yet further, due to the fact that the distances through which the brushes 12a through 12c slide upon the ring members 11a through 11c are reduced, the amount of heat generated by friction between them is also reduced, so that the temperatures of the brushes 12a through 12c are further reduced, and moreover the amounts of wear upon the brushes 12a through 12c are further reduced.

However, in this embodiment, since as shown in FIG. 19, spline engagement is also provided at the portion that is located on the radially inward side of the ring members 11a through 11c, accordingly it is possible to assist the transmission of power at those portions. In this case, it is possible to reduce the lengths of the external spline portion 16 and of the internal spline portion 17 that are provided at the portions that lie on the radially inward side with respect to the ring members 11a through 11c. Since, due to this, it is possible to make the overall length of the input shaft 3 shorter, accordingly it is possible to reduce the length of the compound motor 1 in the axial direction.

The present invention is not limited to the above-described embodiments, and various modifications of the present invention may be provided as following embodiments for example. The slip ring device to which the cooling structure of the present invention is applied is not limited to being one that has three ring members. In fact, the present invention could be applied to any slip ring device that is provided with one or more ring members. Moreover, the number of brushes in the slip ring device of the present invention is not limited to being six for each of the ring members. The number of brushes to be provided to a single ring member could also be any number from one through five. Moreover, it would also be possible to provide seven or more brushes to a single ring member.

The slip ring device to which the cooling structure according to the present invention is applied is not limited to being a slip ring device that is provided to a rotating electrical machine such as a compound motor or the like. The present invention may be applied to slip ring devices that are provided to various types of machine. Moreover, the coolant employed for the present invention is not limited to being oil; it would be possible to utilize any well known coolant that is in general use.

The invention claimed is:

1. A cooling structure applied to a slip ring device comprising at least one ring member provided upon a rotation shaft and at least one brush being provided for each of said at least one ring member to contact with the ring member, wherein said rotation shaft comprises:
   a shaft member upon an outer circumferential surface of which an external spline portion is formed; and
   a cylindrical member installed over an outer circumference of said shaft member so that an internal spline portion formed on an inner circumferential surface of said cylindrical member is meshed with said external spline portion, and said cylindrical member is provided with said at least one ring member that is fixed to an outer circumferential surface of said cylindrical member, and
   said internal spline portion is formed on a portion of an inner circumferential surface of said cylindrical member, the portion lying on a radially inward side with respect to said at least one ring member.

2. The cooling structure according to claim 1, further comprising a coolant supply device that supplies coolant to a space where said internal spline portion is disposed, the space being defined between said shaft member and said cylindrical member.

3. The cooling structure according to claim 2, wherein:
   said external spline portion is formed upon a portion of the outer circumferential surface of said shaft member, the portion lying on a radially inward side with respect to said at least one ring member; and
   in at least one of said internal spline portion and said external spline portion, missing spline portions at each of which one of ridges arranged in a circumferential direction is lacked are provided.

4. The cooling structure according to claim 2, wherein:
   said rotation shaft is provided to a rotating electrical machine;
   a plurality of said ring members are provided upon said rotation shaft so as to be lined up in sequence along an axial-line direction;
   during operation of said rotating electrical machine, temperature differences are generated between the plurality of ring members;
   said external spline portion is provided upon a portion of the outer circumferential surface of said shaft member, the portion lying on a radially inward side with respect to the plurality of ring members;
   in at least one of said internal spline portion and said external spline portion, a missing spline range is provided in which all ridges arranged in a circumferential direction are lacked over a predetermined length in the axial-line direction; and said missing spline range is provided on a radially inward side with respect to one of the ring members whose temperature is the lowest during the operation of said rotating electrical machine.

5. The cooling structure according to claim 2, wherein:
   said rotation shaft is provided to a rotating electrical machine;
   three of the ring members are provided upon said rotation shaft so as to be lined up in sequence along an axial-line direction;
   said external spline portion is provided upon a portion of the outer circumferential surface of said shaft member, the portion lying on a radially inward side with respect to the three ring members;
   in at least one of said internal spline portion and said external spline portion, a missing spline range is provided in which all ridges arranged in a circumferential direction are lacked over a predetermined length in the axial-line direction; and
   said missing spline range is provided on a radially inward side with respect to two of the three ring members disposed at both ends of the three ring members.

6. The cooling structure according to claim 4, wherein missing spline portions at each of which one of ridges arranged in a circumferential direction is lacked are provided in at least one of said internal spline portion and said external spline portion.

7. The cooling structure according to claim 1, wherein said rotation shaft is provided to a rotating electrical machine,
   said rotating electrical machine comprises: a first rotor that is disposed around the external circumference of said rotation shaft so as to leave a space between the first rotor and the rotation shaft, and also is linked to said cylindrical member; and a second rotor that is disposed coaxially around the external circumference of said first rotor and also is rotatable relatively to said first rotor, and
   said slip ring device is disposed in said space between said first rotor and said rotation shaft.

8. The cooling structure according to claim 7, further comprising:
   a coolant passage that comprises a first flow passage provided so as to extend along a center portion of said shaft member in an axial-line direction, a second flow passage defined between said shaft member and said cylindrical member and provided with said internal spline portion, and a connection passage that connects said first flow passage and said second flow passage; and a coolant supply device that supplies coolant to said coolant passage so that said coolant flows in order through said first flow passage, said connection passage, and said second flow passage, and wherein:

a plurality of said ring members are provided upon said rotation shaft so as to be lined up in sequence along the axial-line direction;

said first flow passage is provided so as to pass through the radially inward side with respect to said plurality of ring members, and one end portion of said first flow passage is located on the radially inward side with respect to a ring member that is disposed at one end of said sequence of said plurality of ring members; and said connection passage is provided so as to extend in a radially outward direction from said one end portion of said first flow passage.

9. The cooling structure according to claim 8, wherein:

said rotating electrical machine is installed to a drive system of a vehicle;

said shaft member is linked to an output shaft of an internal combustion engine, and said second rotor is linked to an input shaft of a transmission;

said one end portion of said first flow passage and said connection passage are disposed on the radially inward side with respect to a ring member that is disposed closest to said internal combustion engine within said sequence of said plurality of ring members; and said coolant supply device supplies said coolant to said coolant passage so that said coolant first flows through said first flow passage from a transmission side to an internal combustion engine side, then flows from said first flow passage via said connection passage into said second flow passage, and then flows through said second flow passage from said internal combustion engine side to said transmission side.

10. The cooling structure according to claim 8, wherein:

said rotating electrical device is a three phase AC type rotating electrical machine;

three of said ring members are provided upon said rotation shaft so as to be lined up in sequence along the axial-line direction;

said external spline portion is formed upon a portion of the outer circumferential surface of said shaft member, the portion lying on the radially inward side with respect to said three ring members;

in at least one of said internal spline portion and said external spline portion, a missing spline range is provided in which all ridges arranged in a circumferential direction are lacked over a predetermined length in the axial-line direction; and said missing spline range is provided on the radially inward side with respect to at least one of two ring members lying at both ends of the three ring members.

11. The cooling structure according to claim 10, wherein, missing spline portions at each of which one of ridges arranged in a circumferential direction is lacked are provided in at least one of said internal spline portion and said external spline portion.

12. The cooling structure according to claim 5, wherein missing spline portions at each of which one of ridges arranged in a circumferential direction is lacked are provided in at least one of said internal spline portion and said external spline portion.

13. The cooling structure according to claim 9, wherein:

said rotating electrical device is a three phase AC type rotating electrical machine;

three of said ring members are provided upon said rotation shaft so as to be lined up in sequence along the axial-line direction;

said external spline portion is formed upon a portion of the outer circumferential surface of said shaft member, the portion lying on the radially inward side with respect to said three ring members;

in at least one of said internal spline portion and said external spline portion, a missing spline range is provided in which all ridges arranged in a circumferential direction are lacked over a predetermined length in the axial-line direction; and said missing spline range is provided on the radially inward side with respect to at least one of two ring members lying at both ends of the three ring members.

* * * * *